US010310136B2

(12) United States Patent
Von Gonten et al.

(10) Patent No.: US 10,310,136 B2
(45) Date of Patent: Jun. 4, 2019

(54) LATERAL PLACEMENT AND COMPLETION DESIGN FOR IMPROVED WELL PERFORMANCE OF UNCONVENTIONAL RESERVOIRS

(71) Applicant: W.D. VON GONTEN LABORATORIES INC., Houston, TX (US)

(72) Inventors: William D. Von Gonten, Houston, TX (US); Roberto Suarez-Rivera, Houston, TX (US); John Graham, Houston, TX (US)

(73) Assignee: W.D. Von Gonten Laboratories Inc., Houston, TX (US)

( * ) Notice: Subject to any disclaimer, the term of this patent is extended or adjusted under 35 U.S.C. 154(b) by 401 days.

(21) Appl. No.: 15/137,629

(22) Filed: Apr. 25, 2016

(65) Prior Publication Data

US 2016/0313469 A1  Oct. 27, 2016

Related U.S. Application Data

(60) Provisional application No. 62/152,167, filed on Apr. 24, 2015.

(51) Int. Cl.
*G01V 1/50* (2006.01)
*G01V 99/00* (2009.01)
(Continued)

(52) U.S. Cl.
CPC ............ *G01V 99/005* (2013.01); *E21B 49/00* (2013.01); *G01V 1/50* (2013.01); *G01V 11/002* (2013.01); *G01V 11/00* (2013.01); *G01V 2210/66* (2013.01)

(58) Field of Classification Search
None
See application file for complete search history.

(56) References Cited

U.S. PATENT DOCUMENTS

| | | | | |
|---|---|---|---|---|
| 5,325,921 A | * | 7/1994 | Johnson | .................... C09K 8/08 166/280.1 |
| 6,374,185 B1 | * | 4/2002 | Taner | ..................... G01V 1/282 367/73 |

(Continued)

OTHER PUBLICATIONS

"Whole Core CT Scanning from Core Flow Services", Schlumberger, 2013 (2 pages).

(Continued)

*Primary Examiner* — Kibrom K Gebresilassie
(74) *Attorney, Agent, or Firm* — Jonathan M. Pierce; Porter Hedges LLP

(57) ABSTRACT

A method is performed for defining optimal landing location (s) of horizontal wells for hydraulic fracturing stimulation, for improved well performance of unconventional reservoirs. The method includes evaluating one or more planes of weakness, pinch-out points, or thin rock layering in the reservoir that may impede hydraulic fracture growth or may close fractured sections during production. The method can include conducting detailed analysis on core and open hole logs, and defining the presence, density, orientation, spacing, and mechanical properties of various thin interfaces and barriers in the rock mass. The method can include classifying the barriers or thin interfaces based on their effect on hydraulic fracture growth or fracture connectivity, and on uncertainty of their effect.

17 Claims, 19 Drawing Sheets

(51) Int. Cl.
*E21B 49/00* (2006.01)
*G01V 11/00* (2006.01)

(56) References Cited

U.S. PATENT DOCUMENTS

| | | | | |
|---|---|---|---|---|
| 7,032,671 | B2* | 4/2006 | Aud | E21B 43/26 166/250.1 |
| 8,175,807 | B2 | 5/2012 | Suarez-Rivera et al. | |
| 8,347,959 | B2 | 1/2013 | Suarez-Rivera et al. | |
| 8,571,799 | B2 | 10/2013 | Suarez-Rivera et al. | |
| 8,646,526 | B2 | 2/2014 | Suarez-Rivera et al. | |
| 8,899,349 | B2 | 12/2014 | Rasmus et al. | |
| 9,140,109 | B2 | 9/2015 | Suarez-Rivera et al. | |
| 9,709,477 | B2 | 7/2017 | Chertov et al. | |
| 9,709,478 | B2 | 7/2017 | Chertov et al. | |
| 9,746,410 | B2 | 8/2017 | Chertov et al. | |
| 9,927,344 | B2 | 3/2018 | Chertov et al. | |
| 2004/0199329 | A1* | 10/2004 | Stone | G01V 11/00 702/13 |
| 2004/0211567 | A1* | 10/2004 | Aud | E21B 43/26 166/308.1 |
| 2005/0149307 | A1* | 7/2005 | Gurpinar | E21B 43/00 703/10 |
| 2008/0162098 | A1 | 7/2008 | Suarez-Rivera et al. | |
| 2009/0260415 | A1 | 10/2009 | Suarez-Rivera et al. | |
| 2009/0319243 | A1* | 12/2009 | Suarez-Rivera | E21B 43/00 703/10 |
| 2010/0230095 | A1* | 9/2010 | Yin | G01V 3/28 166/250.1 |
| 2010/0236783 | A1* | 9/2010 | Nenniger | C09K 8/58 166/305.1 |
| 2010/0305927 | A1* | 12/2010 | Suarez-Rivera | E21B 49/00 703/10 |
| 2011/0066390 | A1 | 3/2011 | Macleod et al. | |
| 2013/0259190 | A1 | 10/2013 | Walls et al. | |
| 2013/0262069 | A1* | 10/2013 | Leonard | E21B 43/00 703/10 |
| 2014/0182844 | A1* | 7/2014 | Wutherich | E21B 43/26 166/250.02 |
| 2015/0075784 | A1* | 3/2015 | Fonseca Ocampos | E21B 43/26 166/250.1 |
| 2016/0108705 | A1* | 4/2016 | Maxwell | E21B 43/267 166/250.1 |
| 2017/0045636 | A1* | 2/2017 | Ma | E21B 43/26 |
| 2017/0096886 | A1* | 4/2017 | Chuprakov | E21B 49/00 |
| 2017/0138872 | A1* | 5/2017 | Suarez-Rivera | G01N 25/02 |
| 2017/0226850 | A1* | 8/2017 | Shako | E21B 49/00 |

OTHER PUBLICATIONS

Ayyalasomayajula, K.K., et al, Analysis of Calibration Materials to Improve Dual-energy CT Scanning for Petrophysical Applications, SPE 146522, 2011. (11 pages).

M.E. Coles, E.L. Muegge, F.M. Auzerais, P. Frulla, and A. Kantzas, The Use of Attenuation Standards for CT Scanning, Society of Core Analysts Conference paper 9513 (12 pages).

Owen, LB., Fredrich, J.T., Martin, J.W., and van Bree, R.E., Non-Invasive, Non-Destructive Measurement of Bulk Density, Porosity, and Water Saturation in Zeolitic Tuffs by X-Ray CT Analysis, (abstract) American Geophysical Union, Fall Meeting, San Francisco, California, U.S.A. Dec. 6-10, 1993, (2 pages).

S.L. Wellington and H.J. Vinegar, X-Ray Computerized Tomography, Journal pf Petroleum Technology, Aug. 1987, pp. 885-898.

Z. Ying, R. Naidu and C.R. Crawford, Dual Energy Computed tomography for explosive detection, Journal of X-Ray Science and Technology, 14 (2006) 235-256.

J. Walls and M. Armbruster, "Shale Reservoir Evaluation Improved by Dual Energy X-Ray CT Imaging" JPT, vol. 64, No. 12, Nov. 2012, pp. 28-32.

Castanier, L.M., An Introduction to Computerized X-ray Tomography for Petroleum Research, U.S. Department of Energy Contract DE-FG19-87BC14126, Supri TR 66. May 1989. (46 pages).

Schlumberger (TerraTek), Characterization and Completion Design of Unconventional Reservoirs, Tight Rock Analysis (4 pages).

Schlumberger, Guide to Core-Based Characterization for Unconventional Rocks, TerraTek Laboratory, Salt Lake City, Utah (34 pages).

Ahmed et al., Fracturability Index is a Mineralogical Index: A new approach for Fracturing Decision, SPE-SAS-357, Al-Khobar, Saudi Arabia, Apr. 21-23, 2015 (34 pages).

Siddiqui et al., Dual-Energy CT-Scanning Applications in Rock Characterization, SPE-90520, SPE Annual Technical Conference and Exhibition held in Houston, Texas, U.S.A., Sep. 26-29, 2004 (9 pages).

Suarez-Rivera et al., Continuous Scratch Testing on Core Allows Effective Calibration of Log-Derived Mechanical Properties for Use in Sanding Prediction Evaluation, SPE/ISRM 78157, Irving, Texas, Oct. 20-23, 2002 (7 pages).

Joel Walls and Steven Sinclair, Digital Rock Physics Provide Critical Insights to Characterize Eagle Ford, The American Oil & Gas Reporter, Feb. 2011 (4 pages).

Walls et al., Eagle Ford Shale Reservoir Properties from Digital Rock Physics, Recovery—2011 CSPG CSED CWLS Convention, (5 pages).

\* cited by examiner

LATERAL PLACEMENT AND COMPLETION DESIGN FOR IMPROVED WELL PERFORMANCE OF UNCONVENTIONAL RESERVOIRS

CROSS-REFERENCE TO RELATED APPLICATIONS

This application claims the benefit of U.S. provisional patent application Ser. No. 62/152,167 filed on Apr. 24, 2015, which is incorporated herein by reference.

BACKGROUND

The present disclosure relates to techniques to increase and/or optimize reservoir production, and more particularity, to selection of geological zones for landing horizontal wellbores for subsequent hydraulic fracturing. The present disclosure relates to core characterization, and the evaluation of rock layering and interface properties on hydraulic fracture growth and connectivity. The present disclosure relates to the evaluation of production potential from fracturing rocks with complex fabric. The present disclosure relates to selecting landing locations based on an evaluation of potential fracture segmentation and maximizing fracture connectivity for optimal well production.

Various methods have been proposed for optimal selection of horizontal wellbore trajectories. These various methods are primarily based on geometrical considerations of the wellbore trajectory, on the evaluation of bulk reservoir and mechanical rock properties, or on both geometrical considerations and the evaluation of bulk reservoir and mechanical rock properties. The methods based on geometrical considerations of the wellbore trajectory emphasize problems and opportunities of having wellbores with complex trajectories. It is generally widely accepted that complex trajectories result in complex pathways for production, create traps for liquid loading and are, in general, detrimental to hydrocarbon production. When possible, it is thus preferable to have simple, linear, well paths. The methods based on the evaluation of bulk reservoir and mechanical rock properties emphasize criteria based on the quality of the reservoir, which could be evaluated via a single property (e.g., highest porosity, highest permeability, highest Gamma Ray radiation level), or a combination of these properties.

Methods for lateral placement and completion design have also been proposed based on completion quality (e.g., minimum stress, brittleness, presence of fractures), or a combination of completion quality considerations and reservoir quality. For example, at the time of writing in 2015, service providers are currently using a combination of well trajectory control, to place the wellbore in the zone with best reservoir quality, and using log- or drill cuttings-derived properties to place perforation stages in regions with uniform stress (as predicted along the wellbore).

In general these methods for lateral placement and completion design are based on well log measurements or seismic data. Some methods use statistical analysis of properties measured on logs, or properties evaluated at grid cells on 3D earth models, to calculate their criterion for lateral landing.

There is no known method that proposes landing laterals based on the presence and distribution of weak interfaces and thin rock layering on reservoirs with complex fabric. There is no known method that focuses on rock weak planes, pinch-out points, or thin rock layering, and utilizes geologic, petro-physical properties measured on cores, to understand fracturing behavior in reservoirs with complex fabric, and the effect of the complex fabric on hydraulic fracture growth. There is currently no other method that takes into consideration interfaces and thin layering to evaluate production potential and landing locations.

Because the thickness of thin interfaces may range from a few millimeters to a few centimeters, these thin interfaces may be difficult to detect using standard resolution open hole logs, and are not part of any conventional method of evaluation. The same detection difficulty occurs in the reservoirs with thin rock layering.

SUMMARY

A method comprises conducting a geologic core study on a core sample obtained in a wellbore, conducting core logging measurements on the core sample, and mapping a fracture barrier based on an integration of the geologic core study and the core logging measurements. The method may further comprise integrating the geologic core study, the core logging measurements, and a high resolution open hole log. The method may further comprise training an expert system on the geologic core study and the core logging measurements to recognize the fracture barrier on the high resolution open hole log, and using the trained expert system on a second high resolution open hole log from a second wellbore. The method may further comprise classifying the fracture barrier as one of a thick lithologic barrier that arrests fracture height growth, a pinch-out point that isolates fracture segments, a weak plane that generates fracture stepovers, branching or loss of hydraulic energy, or thin rock layering that reduces fracture growth. The method may further comprise selecting a compartmentation height, averaging hydrocarbon filled porosity over the compartmentation height, averaging a number of fracture barriers over the compartmentation height, and integrating the averaged hydrocarbon filled porosity and the averaged number of fracture barriers. The method may further comprise assigning a confidence level to the fracture barrier. The method may further comprise adjusting the confidence level based on a proximity of the fracture barrier to perforation stages or a density of fracture barriers. The method may further comprise predicting fracture growth based on the mapping of the fracture barrier. The method may further comprise generating a landing recommendation based on the integration of the geologic core study and the core logging measurements. The method may further comprise generating a model based on the mapping of the fracture barrier and the landing recommendation, conducting hydraulic fracturing simulations to test the model, and field testing to validate the model.

A computer readable storage medium comprises stored instructions. The instructions, when executed, cause a processor to receive measurements relating to a geologic core study on a core sample from a wellbore. The instructions, when executed, cause the processor to receive core logging measurements on the core sample. The instructions, when executed, cause the processor to map a fracture barrier based on integrating the geologic core study and the core logging measurements. The computer readable storage medium may further store instructions that, when executed, cause the processor to integrate the geologic core study, the core logging measurements, layering and interface properties, and a high resolution open hole log. The computer readable storage medium may further store instructions that, when executed, cause the processor to classify the fracture barrier as a thick lithologic barrier that arrests fracture height growth, a pinch-out point that isolates fracture segments, a weak plane that generates fracture step-overs, branching or loss of hydraulic energy, or thin rock layering that reduces fracture growth. The computer readable storage medium may further store instructions that, when executed, cause the processor to average hydrocarbon filled porosity over a selected compartmentation height. The instructions, when executed, may cause the processor to average a number of fracture barriers over the selected compartmentation height. The instructions, when executed, may cause the processor to integrate the averaged hydrocarbon filled porosity and the average number of fracture barriers. The computer readable storage medium may further store instructions that, when executed, cause the processor to generate a landing recommendation based on integrating the averaged hydrocarbon filled porosity and the averaged number of fracture barriers. The computer readable storage medium may further store instructions that, when executed, cause the processor to generate a model based on mapping of the fracture barriers and on the landing recommendation. The instructions, when executed, may cause the processor to validate the model based on a plurality of measurements obtained in a field test. The computer readable storage medium may further store instructions that, when executed, cause the processor to predict fracture growth based on mapping the fracture barrier. The computer readable storage medium may further store instructions that, when executed, cause the processor to assign a confidence level to the fracture barrier based on the integration of the geologic core study and the core logging measurements, or layering and interface properties.

A system comprises a tool disposed in a wellbore and a surface unit including a processor and configured to receive measurements relating to a geologic core study on a core sample, receive core logging measurements on the core sample, map a fracture barrier based on an integration of the geologic core study and the core logging measurements, generate a landing recommendation based on the mapping of the fracture barrier, and generate a hydraulic fracturing model based on the mapped fracture barrier and the landing recommendation. The tool is configured to measure hydraulic conductivity of a fracture created by fracturing the wellbore. The surface unit is configured to validate the model with the measurement of hydraulic conductivity. The system surface unit may further be configured to average hydrocarbon filled porosity over a selected compartmentation height, average a number of fracture barriers over the selected compartmentation height, and integrate the averaged hydrocarbon filled porosity and the averaged number of fracture barriers. The surface unit may further be configured to classify the fracture barrier as a thick lithologic barrier that arrests fracture height growth, a pinch-out point that isolates fracture segments, a weak plane that generates fracture step-overs, branching or loss of hydraulic energy, or thin rock layering that reduces fracture growth, and assign a confidence level to the fracture barrier. The landing recommendation may also be based on the classification of the fracture barrier, the confidence level, or a combination of the classification of and the confidence level.

BRIEF DESCRIPTION OF THE DRAWINGS

Embodiments of systems, apparatuses, and methods for lateral placement for improved well performance are described with reference to the following figures. Like numbers are used throughout the figures to reference like features and components.

FIG. 15 also shows validation with field pilot tests.

DEFINITIONS

Figure 1C:
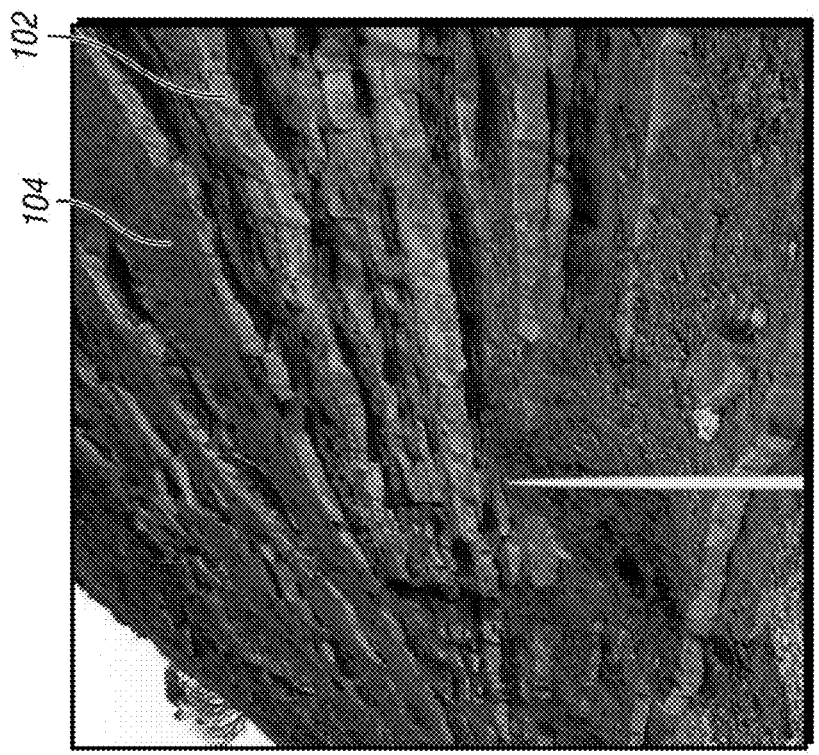
FIGS. 1A, 1B and 1C are photographs showing formations with strong mechanical stratigraphy.

Formation refers to a subterranean body of rock that is sufficient, distinctive, and continuous; and could be a reservoir or non-reservoir region.

Horizontal or deviated wellbore refers to a wellbore drilled in the horizontal direction within formations or more generally in a direction parallel to formation boundaries. Horizontal well orientations may allow a considerable larger contact with a selected formation than vertical or inclined wellbores.

Wellbore landing or lateral placement refers to the selection of a depth at which a horizontal wellbore branches off a vertical well, or a depth at which the trajectory of a wellbore has transitioned to essentially a horizontal trajectory. It also refers to the maximum allowable departure from the specified depth (for example 7560 feet±5 feet).

Reservoir refers to a formation that contains sufficient volume hydrocarbons in its void (porous) space, has mobile hydrocarbons at reservoir temperature and pressure, and has sufficient permeability to allow the production of the contained hydrocarbon.

Reservoir quality refers to a set of properties of the reservoir rock that define its quality in relation to hydrocarbon in place (e.g., hydrocarbon filled porosity or "HFP", effective porosity, organic content, degree of maturation, others) and the potential hydrocarbon mobility (permeability, hydrocarbon viscosity, hydrocarbon gas oil ratio, reservoir pressure, and the like).

Hydraulic fracture refers to a freshly created surface area on a rock formation by using hydraulic energy. Hydraulic fractures create surface area connected to the wellbore for hydrocarbon production, and hydraulic "fracking," as it is also referred to, enhances production.

Reservoir contact refers to the amount of created surface area in contact with a reservoir. The amount is the sum of the wellbore surface area and the hydraulic fracture surface area created within the reservoir.

Fracture growth refers to the growth of a fracture away from a wellbore. This may be vertical, deviated or horizontal. The fractures propagate along a generally vertical plane, and extend above and below as well as laterally, from the perforated interval.

Well production refers to a total volume of hydrocarbons produced from a well. The well production is typically directly proportional to the reservoir contact.

Economic potential refers to the value of the product of oil saturation $S_o$ by porosity $\Phi$ by reservoir contact thickness h. This value is utilized to compute the Estimated Ultimate Recovery ("EUR"). Logs usually represent the cumulative value of the economic potential, where the reservoir contact thickness h is taken to be the distance between fracture barriers, and the calculation is re-set at each barrier.

Geologic core study refers to visual inspection of a core to describe the presence, distribution, and typing of fracture barriers (including thick lithologic barriers, weak interfaces or weak planes, pinch-out points and rock layering), and evaluating the dominant geologic and stratigraphic origin of these fracture barriers.

Mechanical stratigraphy refers to a subdivision of formations into discrete intervals or beds with homogeneous mechanical properties. Complex mechanical stratigraphy refers to sequences of rock units with different properties (e.g., weak and strong, stiff and compliant, brittle and ductile), often resulting in weak contacts at the boundaries between the beds.

Layering and interface properties refer to analysis results of some portions of the core sample, for example including laboratory testing of mechanical strength, composition, and permeability of the portions of the core sample near bed boundaries or thin beds.

Core micro-logging, or core logging, refers to measurements conducted on cores at high-resolution (e.g. mm to cm resolution), to capture the rock fabric, observed in the core, and the corresponding variability in rock properties. Core logging may provide equivalent measurements as obtained at lower resolution in open hole logs, and include but are not limited to: natural Gamma Ray ("GR"), spectral GR components ("K", "Th", "U"), resistivity, bulk density, acoustic velocity, rock strength, rock hardness, rock fluid sensitivity, rock elemental composition, X-ray tomography, and the like.

Fracture barrier, or barrier, refers to a thin bed, or a contact plane or boundary between lithologies or beds that constitutes either a potential hindrance to propagation of a hydraulic fracture or a potential hindrance to flow and proppant transport in a created hydraulic fracture. In any case, fracture barriers are impediments to efficient hydraulic fracturing of the reservoir. Fracture barriers sometimes refer to a set of such thin beds, or thin planes, or contact planes, or boundary between beds. Fracture barriers include thick lithologic barriers, which are conventionally taken into account in fracturing models, as well as weak interfaces and thin rock layering that are not part of any traditional method of evaluation.

Level of confidence refers to the confidence a thin interface constitutes either a hindrance to propagation of a hydraulic fracture or a hindrance to flow in a created hydraulic fracture. Level of confidence/level of risk are used interchangeably herein, because the higher the level of confidence a classified thin interface constitutes an impediment to efficient hydraulic fracturing of the reservoir, the higher the risk the classified thin interface will constitute an impediment to efficient hydraulic fracturing of the reservoir.

Weak interfaces or weak planes refer to thin interfaces with low shear strength, which may have depositional origin (e.g., ash beds, erosional contacts), stratigraphic origin (bounding units, flooding surfaces), tectonic origin (e.g., mineralized fractures, slickensides), geochemical origin (bitumen-filled expulsion cracks), and others. The end result, however, is that they are weak in relation to the adjacent lithologies or beds and fail in shear as the hydraulic fracture approaches them or intersects them. As used herein, weak planes are a type of fracture barrier.

Thin rock layering refers to regions containing adjacent thin rocks pairs or couplets with contrasting rock properties (hard to soft, high modulus to low modulus, high density to low density, high velocity to low velocity, and others) which reduce the normal fracture growth of a hydraulic fracture as a function of the degree of property contrast and their density (number of couplets per unit length). The contacts between the rock pairs are thin layers, and can be weak layers. Thus, often thin rock layering results in high density of weak interfaces. As used herein, thin rock layering is a type of fracture barrier.

Pinch-out points refer to soft regions or soft beds along which a fracture may propagate but is likely to collapse and close after fracturing is terminated or during production of hydrocarbon flowing in the fracture. As used herein, pinch-out point is a type of fracture barrier.

Integrating of data refers to a display technique where different data associated with the same location in a wellbore or core sample are displayed side by side, so that correlations between the different data are visualized. Integration of such data is useful for the visualization of the presence and distribution of thin interfaces or barriers, and ultimately for the selection of the potential landing location(s).

Rock fabric and complex fabric refers to the presence and distribution of interfaces in the rock mass, including thin rock layering and any of the multiple types of thin interfaces or barriers discussed herein.

Fracture segmentation refers to a result of pinch-outs and shear failure of a plane of weakness that was intersected by a hydraulic fracture. Depending of the interface properties (weak to strong) the fracture may be arrested, may turn and propagate along the interface, may enter the interface and exit it with a considerable offset or step-over, or may cross it. As the fracturing pressure is lowered (e.g., at the end of fracturing or during production), these step-overs often close, resulting in pinch-outs along the hydraulic fracture, the loss of connectivity, isolated fracture branches, and loss of reservoir contact.

Reservoir compartments or reservoir compartmentation refers to the separation of the initially created reservoir contact by the presence of thin interfaces or fracture barriers. Thus, while the reservoir is still continuous, the contact of the reservoir with the surface area created by the hydraulic fracture is limited to a fraction of the overall reservoir growth. The reservoir compartments that are in contact depend on the location of the lateral wellbore.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The present disclosure relates to methods for selecting the landing location of horizontal wellbores for subsequent hydraulic fracturing and for maximizing well performance and financial returns. The methods are applicable to unconventional reservoirs and other heterogeneous formation exhibiting complex fabric (e.g., laminated systems and mixed lithology systems).

In rocks with complex fabric, hydraulic fractures use considerable hydraulic energy to propagate across and beyond thin interfaces and barriers, eventually developing fracture complexity (e.g., step-overs). Poor proppant transport along complex fractures eventually lead to substantial loss of continuity and connectivity along the created fracture surface area (e.g., pinch-out points). Fracture complexity, and connectivity loss are among the main causes of poor well performance after fracturing. Thin interfaces, thin rock layering, and fracture barriers results in the suppression of fracture growth. Further, the segmentation of the hydraulic surface area (e.g., pinch-out points) is also estimated as a result of the presence, density, or distribution of thin interfaces and thin rock layering.

In the methods of the present disclosure, primary analysis is placed on the mechanical properties of thin interfaces, thin rock layering, and barriers, and rock bulk properties are secondarily considered. The methods rely on the characterization of thin interfaces, thin rock layering and fracture barriers. They are based on an evaluation of the effectiveness of thin interfaces, thin rock layering, and fracture barriers at controlling changes in direction of fracture propagation, at suppressing and arresting fracture propagation, or at isolating fractured segments during production. By understanding the extent and segmentation after hydraulic fracturing and during production for particular landing depth selections, it is possible to evaluate the resulting productivities associated to the landing depth selections. Thus it is possible to select the viable landing location(s) over the un-economical ones.

The thin interfaces are predominantly encountered in stratified beds and can be quantified from core characterization. Sub-vertical planes of weakness also exist along the lateral extent of the reservoir and also affect the hydraulic fracture lateral growth. However, their presence, distribution, density and orientation may not be usually defined, predicted or validated based on core measurements. While the disclosed methods focus on interfaces and barriers that affect the fracture height growth, as defined and measured using cores from pilot wells, the effects of these sub-vertical interfaces on lateral fracture growth may additionally be predicted if lateral data are available (e.g., via high-resolution cross-well tomography) to define these sub-vertical interfaces, and the continuity of these sub-vertical interfaces from one well to another. The optimal landing location may accordingly be modified based on the effects of these sub-vertical interfaces.

The methods include mapping the presence, distribution, and relative strength of these thin interfaces, including sections with thin rock layering, along the formations of interest. The methods estimates the effect of thin interfaces on hydraulic fracture growth: including the effect of mineralized and non-mineralized fractures, soft beds, stratigraphic boundaries, erosional contacts, and other types of mechanically thin interfaces, and sections with thin rock layering. The methods take into account that in layered systems with mixed lithologies (e.g., organic-rich mudstone reservoirs), and particularly when the system is over-pressured, the mechanical properties of the contact boundaries between beds or the resulting thin layers and thin interfaces have a dominant effect on impairing the growth or the connectivity of hydraulic fractures, and these effects often override the effect of contrasting bulk rock properties and contrasting in-situ stress.

One difficulty of predicting fracture growth based on layering and interface properties may be that thin interfaces (e.g., ash beds) that are of relevance to the disclosed methods (and to hydraulic fracturing) may be invisible to standard open hole logs (wellbore logs). The same difficulty is true in the cases with thin rock layering, where the measurements of the thin bed properties are averaged because of the standard log resolution being larger than the typical bed thickness. When thin interfaces or thin layers are thinner than the resolution of standard log measurements, their identification and their properties call for detailed evaluation of cores, outcrops, and high resolution core micro-logger. Studies on core and/or outcrops can be employed to evaluate these interfaces and incorporate detailed geologic studies and millimeter to centimeter resolution core logging measurements to evaluate their presence, distribution and properties.

The mapping of the presence, distribution, and relative strength of these thin interfaces including sections with thin rock layering along the formations of interest is based on integrating a geologic core study and core logging measurements.

In some embodiments, the methods include characterizing these thin interfaces and sections with thin rock layering, as a first order effect, and evaluating bulk formation properties, as a second order effect. For example the thickness of the formations, or their bulk properties, may not be primarily considered to be controlling fracture growth and fracture connectivity, or controlling the selection of landing locations. Instead, the properties of the interfaces, including their frictional strength, surface composition, interface permeability, reservoir pressure, and the layering density and contrast in properties between contrasting rocks in the layers are the primary controlling factors. The characterization of thin interfaces is obtained via methods that provide high-resolution observations to detect these thin interfaces and barriers (e.g., outcrop and core geology and high resolution core-logging).

Different types of interfaces or barriers have differing effects on suppressing hydraulic fracture growth. Classes of interfaces or barriers ('Class 1', 'Class 2', 'Class 3' and 'Class 4') can be defined based on their effect on fracture growth, fracture complexity, or fracture continuity and connectivity.

In one embodiment, 'Class 1' barriers may be defined as including beds exhibiting a bulk material property change that is sufficient to result in a significant change in one of fracture width and fracture height growth. In another embodiment, 'Class 1' barriers may be defined as conventional barriers to fracture propagation (induced by contrast in in-situ stress or contrast or material properties (e.g., Young modulus, Poisson's ratio, density, fracture toughness), that result in significant changes in fracture width and fracture height growth. As such, 'Class 1' barriers are usually extended in depth; however, a 'Class 1' barrier may be defined as a boundary of a bulk material property change that results in a significant change in one of fracture width and fracture growth, and thus be located at a discrete depth.

In one embodiment, 'Class 2' barriers are pinch-out points which will isolate the hydraulic fracture after fracturing and during production. 'Class 2 barriers may occur in at discrete depths or may occur in sets or packages.

In one embodiment, 'Class 3' barriers are defined as weak interfaces, weak planes or weak boundaries with low friction and cohesion and with potential for high localized leak off. These promote fracture step-overs, branching; and a loss of hydraulic fracturing energy.

In one embodiment, 'Class 4' barriers are not boundaries between beds, but represent an extended distribution of thin layers formed by rock pairs or with contrasting properties (e.g., hard/soft couplets), which have interfaces at their contacts.

Additional classes for grouping fracture barrier types that may be seen to have an effect on fracture growth (e.g., thin salt layers) but are not yet part of the above categories may be added to the fracture barrier classification. Further, fewer classes may also be used.

Interfaces or barriers having different levels of confidence have a different potential severity on the propagation of a hydraulic fracture or on the flow connectivity in a created hydraulic fracture after fracturing. Levels of confidence ('L1', 'L2', 'L3', and 'L4') can be defined based on the risk a barrier or thin interface constitutes an impediment to fracture height growth. The levels 'L1' through 'L3' therefore provide a measure of the risk to fracture height growth suppression or containment, with 'L1' being high and 'L3' being lower. In addition, a level 'L4' may be used as a catch-all category for tracking interfaces that may not be well understood but need to be tracked.

In one embodiment, level 'L1' corresponds to a high risk that a barrier or thin interface suppresses or contains fracture height growth, and limits the reservoir contact.

In one embodiment, level 'L2' corresponds to a medium risk that a barrier or thin interface constitutes an impediment fracture height growth. Interfaces corresponding to level 'L2' may not arrest fracture height growth but may suppress or reduce its vertical growth in relation to its lateral growth.

In one embodiment, level 'L3' corresponds to a low risk that a thin interface constitutes an impediment to fracture height growth. Interfaces corresponding to level 'L3' may not arrest or severely restrict the fracture height growth in relation to the fracture lateral growth. However, a large density of level "L3" barriers of interfaces may have the same effect as a lower density of "L2" barriers and that of few "L1" barriers.

For some barriers and thin interfaces, (for example 'Class 3' or 'Class 4' interfaces), the level of confidence may be related to a density or pervasiveness of the thin interface or rock layering (i.e. the number of weak interfaces per unit length of rock over a particular interval, or the number of layers per unit length of rock). For the same level of confidence of associated to the interface type, higher densities increase their level of confidence to a higher level (e.g., "L2 to 'L1'). Density and contrast of properties between adjacent layers are of dominant importance in the confidence level for Class 4 barriers, thin rock layering, when their interfaces are strong. Other parameters that help defining the weakness of an interface, for example, permeability and lubricity, have been incorporated in the confidence level of 'Class 3' and 'Class 4' interfaces. Any additional property that is identified as promoting weakness at an interface will be subsequently incorporated in the confidence level.

Thus, a confidence level may be assigned to a fracture barrier heuristically by geologic analysis and visual interpretation of morphology and composition. When measurements become available, the confidence level assigned to the fracture barrier may be updated based on its mechanical properties. The severity of the fracture barrier depends on the confidence level and may be modified based on the density of barriers per unit rock length or based on proximity of the barrier to the perforation stage. The more barriers or interfaces per unit length, the higher the impact severity on fracture height growth. The further away the fracture propagates from the perforation stage, the lower its hydraulic energy, and the higher the impact severity on fracture height growth.

The methods are optionally refined to integrate these high-resolution observations with the local and regional geology, and with sequence stratigraphy, to construct reasonable predictions of the presence, continuity and distributions of thin interfaces and barriers away from the region studied (e.g., away from pilot wellbores with core).

The disclosed methods may also involve training an expert system on high-resolution open hole logs to recognize these thin interfaces. Training an expert system may include, for example, determining correlation(s) between the open hole logs and properties indicative of thin interfaces. Training an expert system may include, for example, recognition of pattern(s) on the open hole logs indicative of the presence or density of thin interfaces.

The disclosed methods may include field tests in vertical pilot wells, to validate the predicted fracture growth, from each potential landing location. The field tests provide confirmation of the predictions of the fracture growth, confirmation of information used to predict the fracture growth, based on previously unknown conditions. The validated or modified predictions of the fracture growth are then used for the selection of the landing location(s).

The disclosed methods involve selecting the optimal landing location(s) of horizontal wellbores based on reservoir quality and the presence and distribution of thin interfaces and thin rock layering in the reservoir system. For example, reservoir quality may be visualized using a curve representing a cumulative hydrocarbon filled porosity ("HFP") evaluated continuously at every point or representing the cumulative HFP over the length interval of the anticipated fracture growth. The required cumulative HFP cut off for economic production is highlighted. The presence and distribution of thin interfaces in the reservoir system may be visualized using curve representing a cumulative density plot of thin interfaces, computed continuously, within the same length interval specified in the reservoir quality. The curves may be calculated for every thin interface class and then consolidated to provide a single curve.

The integration of reservoir quality, presence and distribution of fracture barriers, and economic production potential, provide a visual definition of the alternative landing locations. The integration is indicative of the production and economic potential of the resulting connected surface area at multiple locations along the region of interest. The production potential permits the selection of the optimal landing location(s) for profitable production.

Figure 1B:
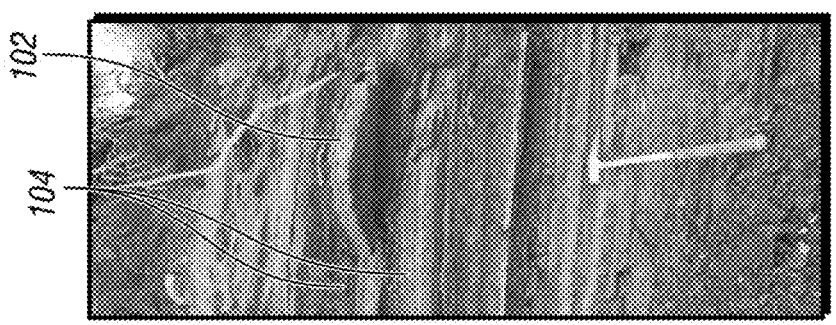
Figure 1A:
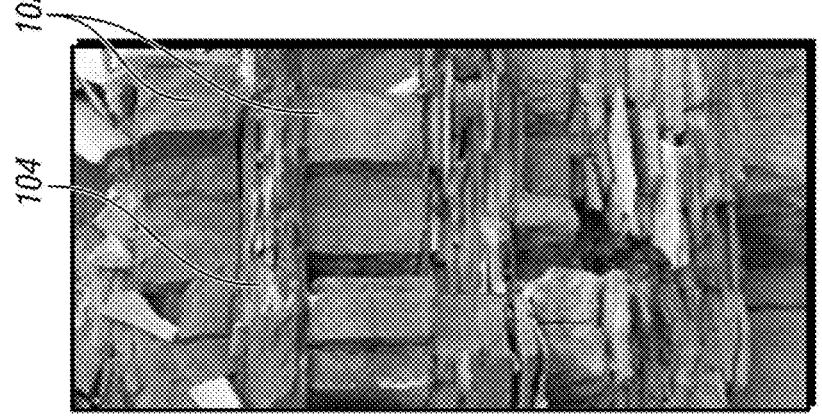

FIGS. 1A, 1B, and 1C show examples of organic-rich formations with strong mechanical stratigraphy that are rich in hydrocarbons. A common characteristic of these formations is their layered nature, and the high contrast in rock properties between layers. Rapid transitions between indurated (hard) units 102 and eroded (soft) units 104 are common. In addition, the contacts at boundaries between hard and soft rock pairs are typically weak, and their weakness often depends on the degree of contrast in their properties. The higher the concentration of hard/soft layers and the higher the concentration of thin interfaces, the stronger the suppression of hydraulic fracture growth, and the stronger the suppression of the development of propped and connected surface area in contact with reservoir quality rock. Also the higher the concentration of hard/soft layers and the higher the concentration of thin interfaces, the larger the density of fracture step-overs, isolated fracture branches, and overall fracture complexity. Some layers and most interfaces are thin and their thickness ranges from one to a few centimeters (e.g., ash beds, calcite filled veins). These are typically not individually visible to standard open hole logs. However, their effect could be observed by their average effect on the bulk log responses. Weak thin interfaces (e.g., ash beds) have low friction angles, no cohesion, and significantly contribute to arresting fracture growth. Evidence of their effectiveness in arresting fracture growth is observed in outcrops, in cores, and in laboratory experiments of fracture propagation.

Figure 2B:
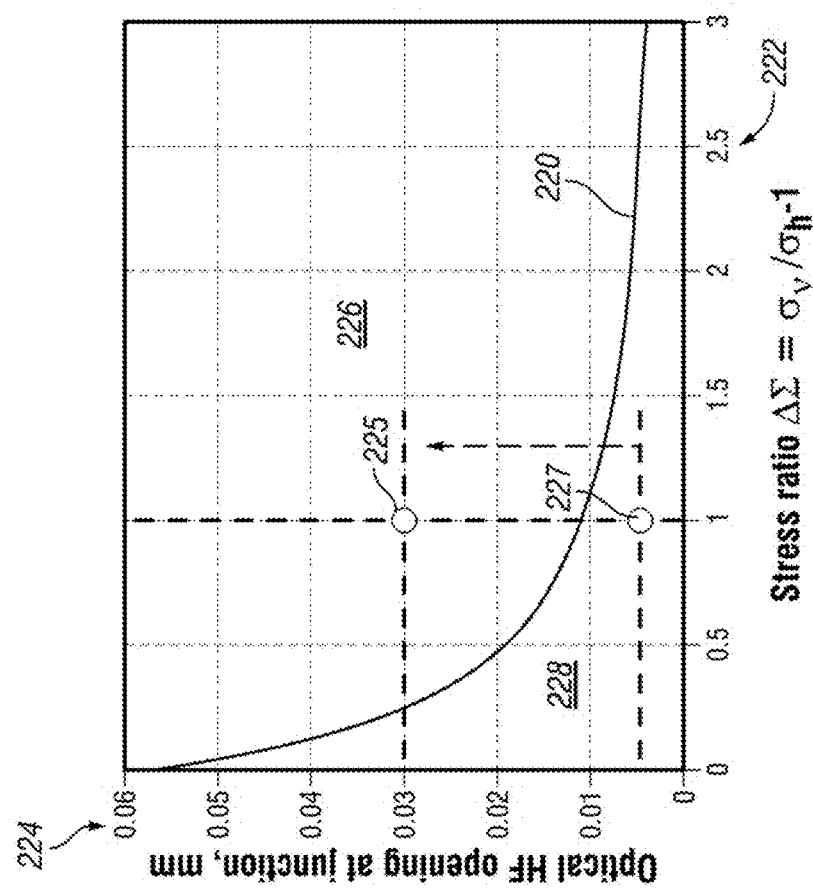
FIG. 2B is a graph showing criteria used for predicting fracture interaction with an interface.
Figure 2A:
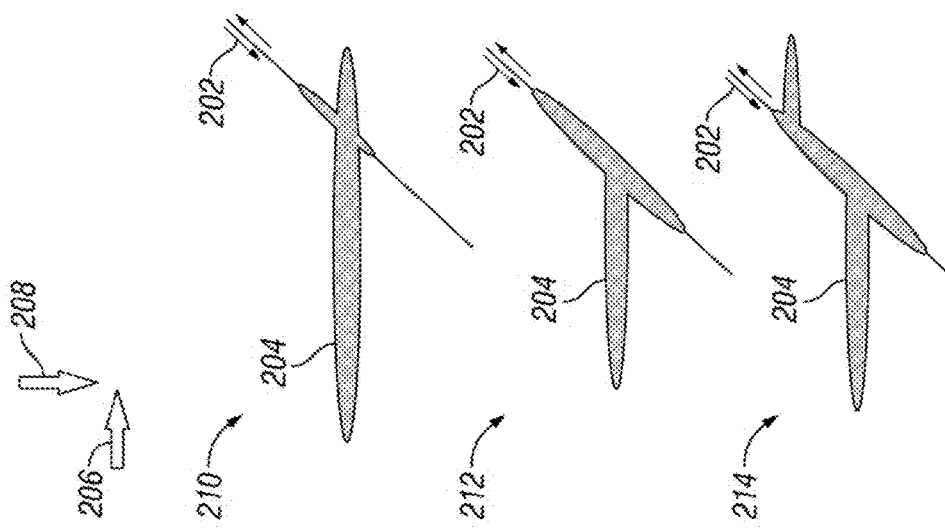
FIG. 2A is a diagram illustrating three scenarios of fracture interaction with an interface.

FIGS. 2A and 2B show criteria for fracture interaction with barriers according to knowledge in the art. In FIG. 2A, horizontal stress components $\sigma_H$ 206 and vertical stress component $\sigma_v$ 208 affect a propagating pressurized crack 204 moving in a layer and approaching a discontinuity, or interface 202. At the interface, the propagating pressurized crack may a) cross 210, b) arrest 212, or c) offset 214, creating a step-over. The curve 220 of FIG. 2B is a function of the stress ratio 222 of the vertical component $\sigma_v$ over the horizontal stress $\sigma_H$ minus one, the critical hydraulic fracture opening 224 at the interface, in millimeters, and the interface mechanical and flow properties. The curve 220 separates an area 226 corresponding to conditions of stress ratio and critical hydraulic fracture opening under which the pressurized crack 204 is crossing the discontinuity or interface 202, from an area 228 corresponding to conditions under which the pressurized crack is arrested by the discontinuity or interface. The location of the areas 226 and 228 (and the location of the curve 220) are controlled by the properties of the interface 202. These criteria suggest that under limited hydraulic fracture width (e.g., slick water fracturing), low stress contrast (e.g., over-pressured formations), and weak, permeable, barriers, the presence of the barriers will arrest fracture growth. For example, under conditions 227, the barriers will arrest fractures. These criteria also indicate that this effect of the barriers over the hydraulic fracture propagation is difficult to overcome. In contrast, under increased hydraulic fracture width, same conditions of stress contrast, and same interface, the fracture will cross the interface (under conditions 229).

Figure 3:
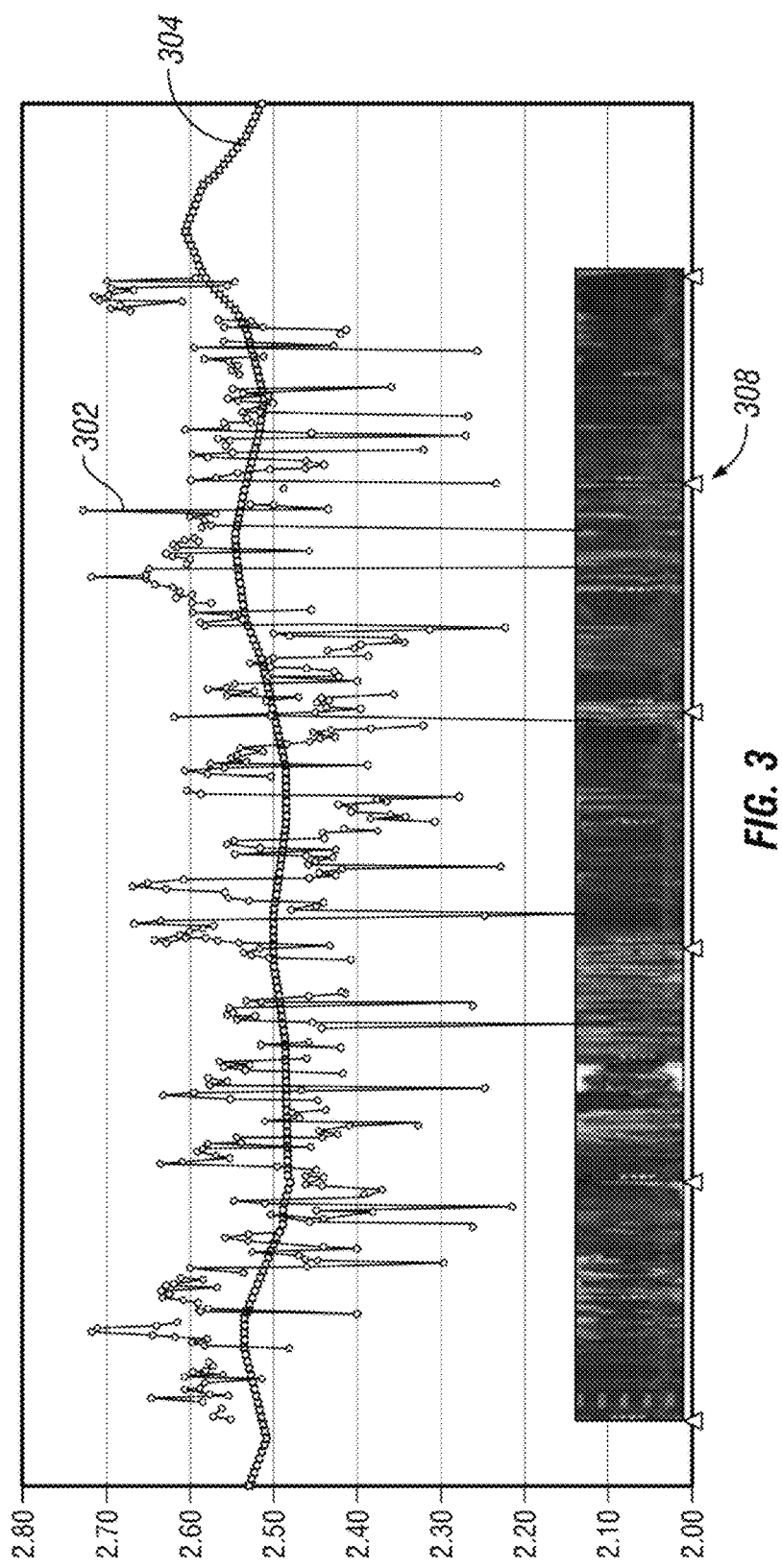
FIG. 3 is a graph showing an example of high resolution measurements on core (core micro-logger), compared to the standard resolution of open hole logs.

FIG. 3 shows an example of high resolution density measurements 302 on core (core micro-logger), compared to the standard resolution density measurement of open hole logs 304. These two measurements 302 and 304 are shown in relation to the core photograph 308 and the high resolution compressive strength. The presence of thin interfaces (e.g., density lower than 2.4) and sections with thin rock layering (e.g., sections with rapidly varying density), are either visually evident on the core photograph 308, or well represented by the core micro-logger measurements 302, but are not seen by the standard-resolution open hole logs 302. Analysis of lateral placement based on standard-resolution open hole logs such as 302 do not contain the necessary information for evaluating fracture height growth containment, for anticipating fracture complexity, or for predicting a realistic surface area in contact with the reservoir. Interfaces and barriers, both of which are non-resolvable with standard-resolution logs, can be used to understand fracture height growth containment and improving reservoir contact.

Figure 4:
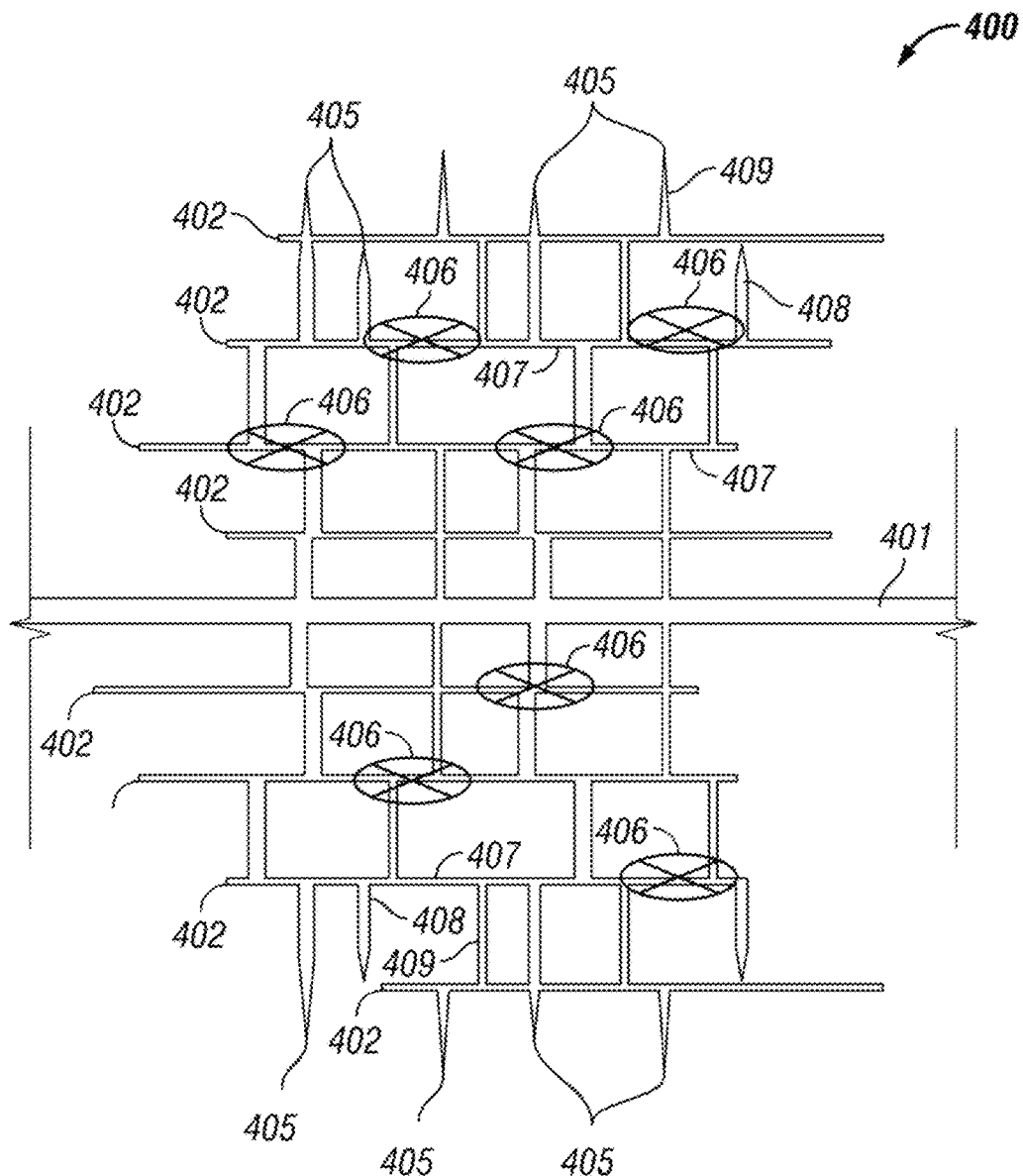
FIG. 4 is a diagram illustrating fracture propagation and the development of fracture geometry, in a region with multiple, parallel, thin interfaces.

FIG. 4 shows a conceptual representation of propagation of fractures 405 from a wellbore 401, and the development of fracture geometry, in a region 400 having parallel beds with barriers and thin interfaces 402. The presence of weak planes promotes the development of step-overs (e.g., 407) or branches (e.g., 408 and 409) during propagation of fractures 405. Pinch-out points 406 may also occur in localized regions of high leak off or in regions with high closure stress. As shown, pinch-out points 406 occur at a crossing of an interface 402 by a fracture 405. The pinch-out points 406 are points of flow isolation where the continuity or connectivity of the fracture 405 is truncated post fracturing. However, given sufficient hydraulic energy (i.e., fracture width) fractures may initially cross interfaces without developing step-overs. These create reservoir contact that remains in contact during production.

The pervasive thin interfaces present in unconventional reservoirs thus provide undesired mechanisms that limit the effective height of the hydraulic fractures that is propped and connected to the wellbore 401. In turn, this truncation of the original fracture height growth reduces reservoir contact and production even if the fractures 405 are in contact with otherwise good reservoir rock rich in hydrocarbon. Further, depending on the distance between the wellbore 401, and the extend and density of the thin interfaces, and type of the thin interfaces, the hydraulic energy associated to hydraulic fracturing (pump rate and fluid viscosity) may or may not be sufficient to create sufficient reservoir contact without step-overs, for economic production. The foregoing mechanisms caused by pervasive thin interfaces of unconventional reservoirs illustrate the importance of careful wellbore placement. Furthermore, in regions where the thin interfaces are overcome with moderate hydraulic energy, step-overs and fracture branches may originate and close after fracturing and depressurization. As a result, the connected fracture area during pumping is larger than the connected fracture area during production. The dominant (main feeder) region of connected surface area, during production, is in general limited to 100 to 200 feet. (fracture half length), as seen by field validation of fracture growth and by reservoir modeling.

Figure 5:
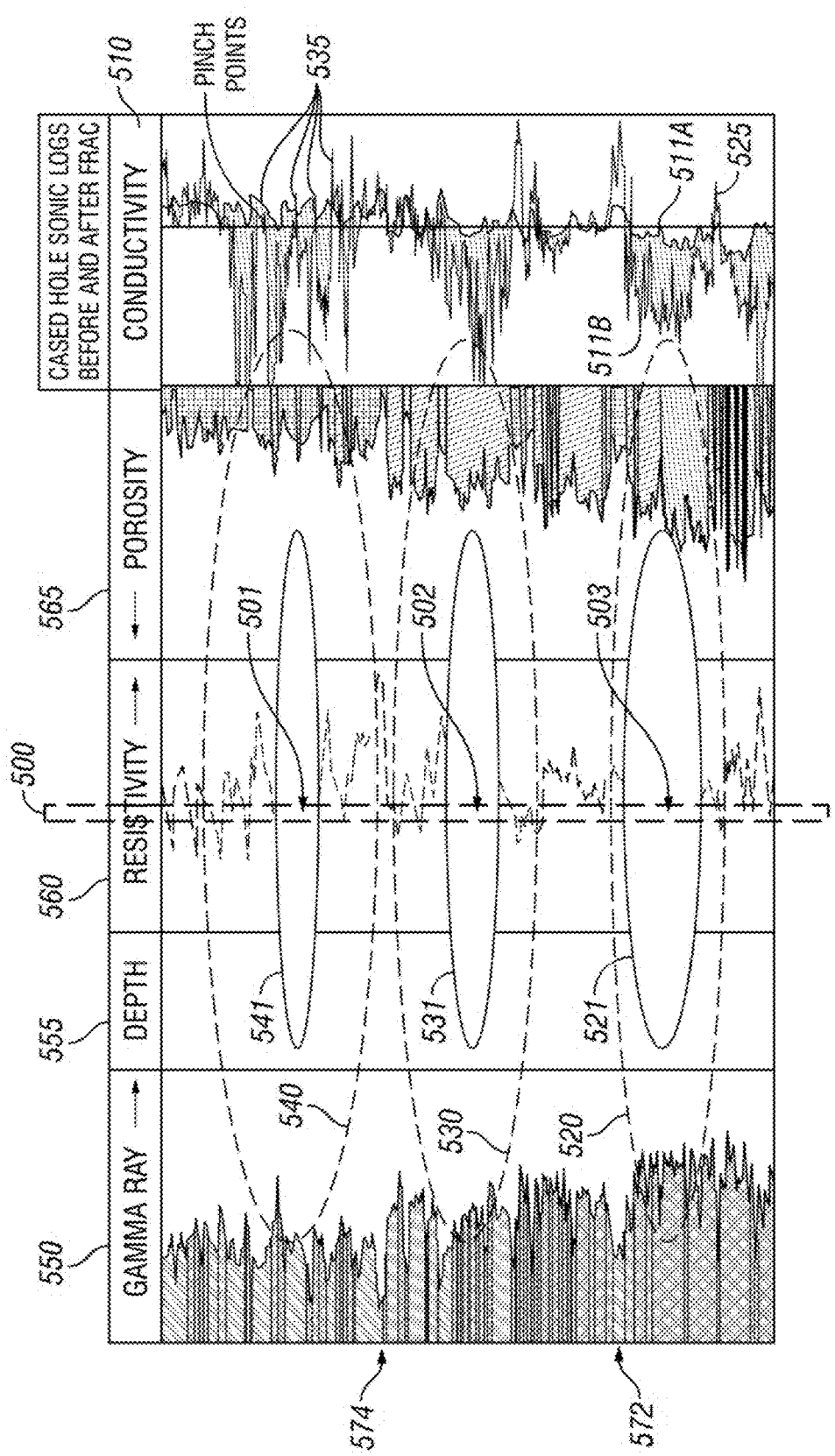
FIG. 5 is a graph showing results from hydraulic fracturing to demonstrate the occurrence of pinch-out after fracking.

FIG. 5 shows a comparison of results of propped surface area of fractures obtained after hydraulic fracturing of a vertical pilot well with anticipated propped surface area of fractures determined from open hole logs. FIG. 5 is the superposition of a representation of a vertical well 500 which has been perforated and stimulated by hydraulic fracturing at three locations 501, 502, and 503 with open hole logs 550, 560, and 565. The superposition is arranged to match the depth 555 of the of the three perforation locations 501, 502, and 503 with the depth at which the measurements to produce the open hole logs 550, 560, 565 and 510 were performed.

Fractures area 520, 530 and 540 illustrates the anticipated propped fracture area using convention methods. With conventional methods, open hole logs 550 and 565 may be used to map possible barriers to fracture propagation before hydraulic fracturing is performed. For example, fracture 520 may be anticipated to extend essentially unrestrictedly below depth 572, which corresponds to a low porosity layer having a distinctive Gamma Ray signature that is conventionally evaluated to be a barrier to hydraulic fracture propagation. Similarly fracture 530 may be anticipated to extend essentially unrestrictedly between depth 572 and depth 574, which corresponds also to a low porosity layer having a distinctive Gamma Ray signature. And finally, fracture 530 may be anticipated to extend essentially unrestrictedly above depth 574.

Fractures area 521, 531 and 541 illustrates actual results of propped surface area of fractures obtained after hydraulic fracturing. The fracture areas 521, 531 and 541 have been determined using a hydraulic conductivity log 510. Hydraulic conductivity was estimated from the difference between dipole shear sonic logs measured pre-fracture (curve 511A) and post-fracture (curve 511B). The area between the curves 511A and 511B indicate the magnitude of hydraulic conductivity. In particular, the area between the curves 511A and 511B shows the occurrence of pinch-out points such as 525, and surface area segmentation 535. For example, the lower fracture from location 503 developed significantly larger downward growth, during fracturing, and thus better contact with the reservoir. However, this lower section subsequently pinched out at 525. The upper fracture from location 501 was connected during fracturing but was segmented in a significant number of disconnected fractures after the treatment at pinch-out points 535.

The example shown in FIG. 5 illustrates the impact of the presence of thin interfaces on fracture propagation and connectivity. Thin interfaces located in the near-wellbore region can be crossed by the hydraulic fracture and, if propped appropriately, remain connected. Thin interfaces located away from the wellbore are more difficult to cross, and typically result in segmentation. Evaluating the potential for surface area segmentation and its impact on well production provides useable information for identifying the optimal landing location(s), for optimizing production, and for maximizing returns.

The example shown in FIG. 5 also illustrates that thin interfaces are not readily apparent from open hole logs 550, 560, 565 measured before hydraulic fracturing. Instead, for evaluating thin interfaces over an interval of interest, a geologic core study on a core sample may be conducted, as well as core logging measurements on the core sample. The thin interfaces may be identified based on integrating the geologic core study and the core logging measurements.

Finally, the example shown in FIG. 5 that hydraulic fracturing performed on a pilot well, and followed with an estimation of hydraulic conductivity, for example from the difference between dipole shear sonic log measured pre-fracture and post-fracture may be used to validate a model predicting fracture growth and fracture connectivity in the presence of thin interfaces, as well as to detect the presence of thin interfaces in cases where a core sample is not available.

Tables 1, 2, 3 and 4 show an example embodiment of fracture barrier characterization used in a wellbore landing model for predicting hydraulic fracturing. Thin interfaces and other fracture barriers are mapped and characterized based on core studies of core micro-logger measurements, core geologic description and core stratigraphy, and by integration with high-resolution borehole images.

The characterization includes classification of fracture barriers ('Class 1', 'Class 2', 'Class 3', 'Class 4') based on the effect that the thin interfaces or other barriers are expected to have on the hydraulic fracturing. The characterization also includes ranking based on the level of confidence ('L1', 'L2', 'L3', and 'L4'). In the example of Tables 1, 2, 3 and 4, the classes are shown subdivided into sub-classes corresponding to levels of confidence; however, this subdivision is optional.

TABLE 1

Description of classes of fracture barriers

| Class | Name | Effect on hydraulic fracturing | Caused by |
|---|---|---|---|
| 1 | Thick lithologic barriers | Arrest fracture propagation; change fracture width | Stress contrast or strong contrast in material bulk properties between beds (at scale of open hole logs) |
| 2 | Pinch-out points | Isolate fracture segment after fracturing/during production | Soft rock units exhibiting deformations, rock units exhibiting strong rock fluid interactions |
| 3 | Weak planes | Promote fracture step-overs, branching, and loss of hydraulic energy | Low cohesion beds prone to high localized leak-off, low friction or lubricated boundaries, thin smooth planes with high conductivity to fluid flow |
| 4 | Thin rock layering | Reduce fracture propagation (e.g., act as pseudo fracture barriers) | Thin layers with contrasting rock properties (e.g., hard/soft couplets, stiff/compliant couplets, dense/sparse couplets) |

TABLE 2

Levels of confidence in 'Class 1'

| Level | Confidence/Risk | Examples | Severity |
|---|---|---|---|
| L1 | High | Boundaries of thick isolated layers | Arrest fracture propagation |
| L2 | Medium | Lithologic contacts with sharp contrast in properties with adjacent layers/sharp contact boundaries | May arrest fracture propagation and will do if their density per unit rock length increases |
| L3 | Low | Lithologic contact with gradual change in properties with adjacent layers/gradual contact boundaries | Will arrest fracture propagation only if their density per unit rock length is high |
| L4 | Unknown | | |

TABLE 3

Levels of confidence in 'Class 2'

| Level | Confidence/Risk | Examples | Severity |
|---|---|---|---|
| L1 | High | Thick non-mineralized ash beds | Will isolate fracture segments during production |

TABLE 3-continued

Levels of confidence in 'Class 2'

Figure 6A:
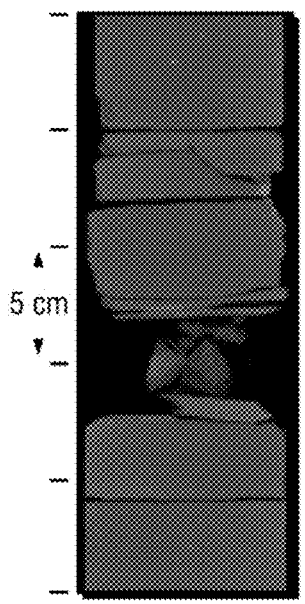
FIGS. 6A, 6B and 6C are photographs of core samples showing ash layers; the ash layers detected from geological core studies are classified as 'Class 2' or 'Class 3' interfaces in an example classification.
Figure 6B:
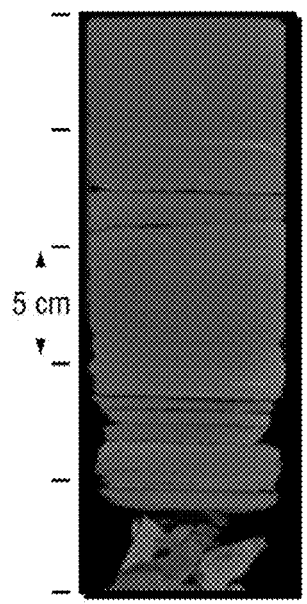

| Level | Confidence/Risk | Examples | Severity |
|---|---|---|---|
| L2 | Medium | Thick ductile layers, see FIGS. 6A and 6B | May isolate fracture segments during production |
| L3 | Low | Rubble zones | Will cause loss of energy during propagation and may some isolate fracture segments during production. |
| L4 | Unknown | | |

TABLE 4

Levels of confidence in 'Class 3'

Figure 6C:
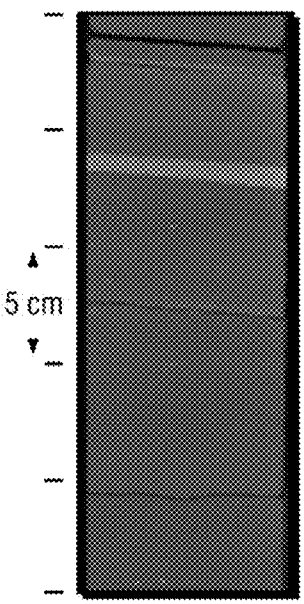
Figure 7A:
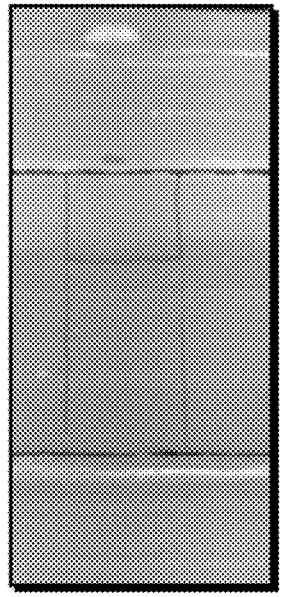
FIGS. 7A, 7B and 7C are photographs of core samples showing fibrous veins; the fibrous veins detected from geological core studies are classified as 'Class 3' interfaces in the example classification.
Figure 7B:
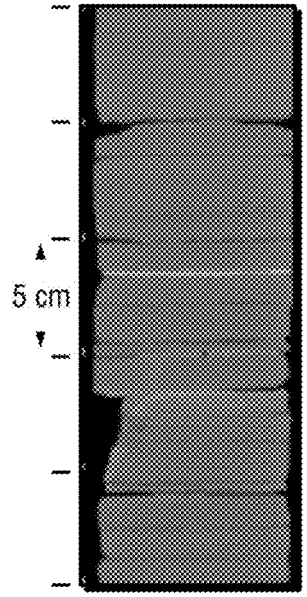
Figure 7C:
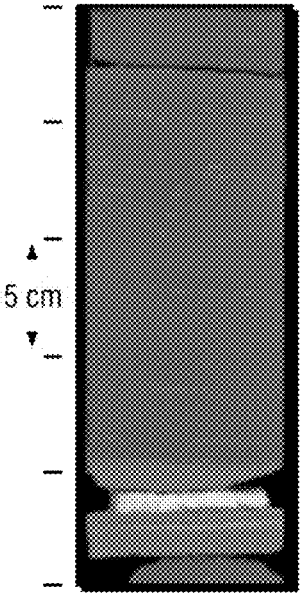

| Level | Confidence/Risk | Examples | Severity |
|---|---|---|---|
| L1 | High | Smectitic interfaces, non-mineralized ash beds, slickensides, interfaces with high organic content, see FIG. 6C | Promote fracture step-overs close to wellbore |
| L2 | Medium | Smooth boundaries between laminated beds with low friction, See FIGS. 7A-7C | May promote fracture step-overs close to the wellbore |
| L3 | Low | Rough boundaries between laminated beds with high friction, textural contrasts | Will promote loss of energy but may not promote fracture step-overs. |
| L4 | Unknown | | |

TABLE 5 levels of confidence in 'Class 4'

Figure 8:
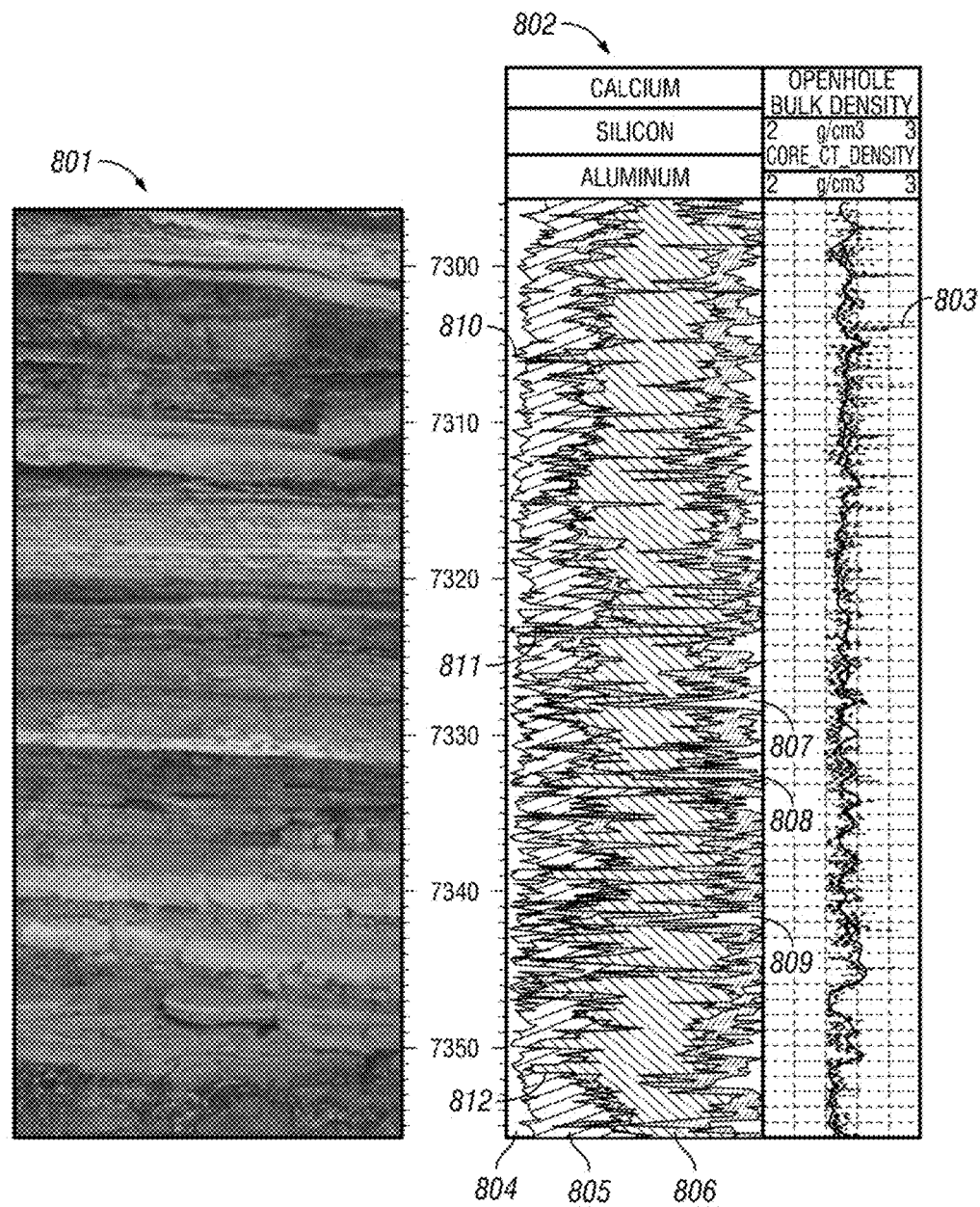
FIG. 8 is an integrated photograph and graph of cm-resolution core logging measurements of a core sample showing thin rock layering classified as 'Class 4' interfaces.

| Level | Confidence/Risk | Examples | Severity |
|---|---|---|---|
| Continuous scale 0-3 | Increases with density x contrast between layers, and interface weakness | See FIG. 8 | Increasing with density/contrast between layers/interface weakness, and interface fluid conductivity |
| L4 | Unknown | | |

FIG. 6A shows a 'Class 2' interface that is ductile ash. FIG. 6B shows a 'Class 2' interface that is another ductile ash. In these cases, the ductile ash was washed and did not survive the coring process. FIG. 6C shows a 'Class 3' interface that is calcified ash.

In turn, FIG. 7A shows a 'Class 3' interface including a fibrous vein. FIG. 7B shows a 'Class 3' interface including another fibrous vein. FIG. 7C shows a 'Class 3' interface including ash and fibrous vein.

FIG. 8 shows a rock sample exhibiting thin rock layering classified as 'Class 4' interfaces. As shown in FIG. 8, a photograph 801 and a graph of cm-resolution micro-logging measurements 802 are integrated to determine a density of planes and a contrast of between the properties of the thin layers. For example, the computed tomography density log 803 shows a succession of layers having a densities that alternate between approximately 2.4 g/cc and 2.6 g/cc. The composition analysis shows a relatively constant amount of aluminum 804. A few thin layers (e.g., 810, 811, and 812) layers are almost devoid of silicon 805 (e.g., limestone). A few thin layers (e.g., 807, 808, and 809) are almost devoid of calcium 806 (e.g., shales).

Figure 9:
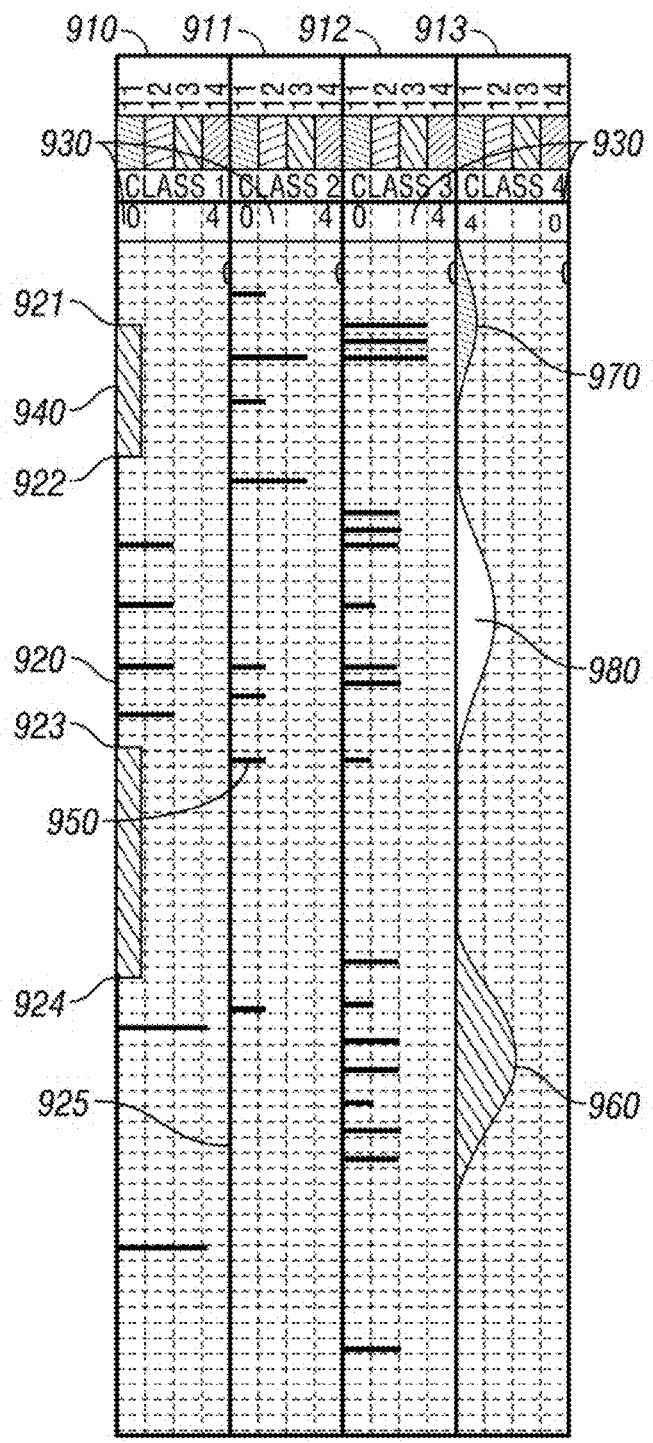
FIG. 9 is a visual display of an example of interface characterization for evaluating hydraulic fracturing to select wellbore placement.

FIG. 9 is a visual display of an example of thin interface mapping and characterization for evaluating hydraulic fracturing for wellbore placement. The display of FIG. 9 utilizes the characterization described in Tables 1, 2, 3 and 4.

The visual display of FIG. 9 comprises four vertical tracks 901, 911, 912, and 913 that correspond to the four classes described in Table 1. The vertical axis 920 represents location along the length of a core sample (not shown).

On each of the tracks, the locations of thin interfaces along the length of the core sample have been mapped using an integration technique involving a geologic core study on the core sample and core logging measurements, and are visualized by adding an area having a width that is proportional to a severity scale 930. In some examples, the severity scale may be taken to be equal to be a linearly decreasing function of the confidence level. That is, a confidence level 'L1' is associated to a severity of 1, and a confidence level 'L3' is associated to a severity of 3.

For example, a 'Class 1' barrier 940 is mapped in vertical track 910, between locations 921 and 922, and has a severity of scale 1. The length of this area represents the thickness of a continuous barrier. A 'Class 2' thin interface 950 is mapped in track 911, at location 923, and has also a severity of scale 1. In this case, because the interface 950 is localized, the area visualizing the interface 950 is reduced to a line. "Class 3" interfaces were also mapped along the length of the core with severity levels ranging from 1 through 3. These resulted from the presence of thin rock layering and weak interfaces between layers. In addition, the cumulative presence of 'Class 4' thin rock layering 960 is mapped in track 913, between locations 924 and 925, and has also a severity of varying scale between 0 and 2.

In addition, the area that visualizes the cumulative concentration of thin rock layering may be evaluated continuously between fracture barriers (e.g., section 923 to 924) or along an interval height where the fracture is predicted to grow. The choice depends on the method that best facilitates the effect of the thin layering on fracture containment, given the presence of the other interfaces and barriers.

Figure 10:
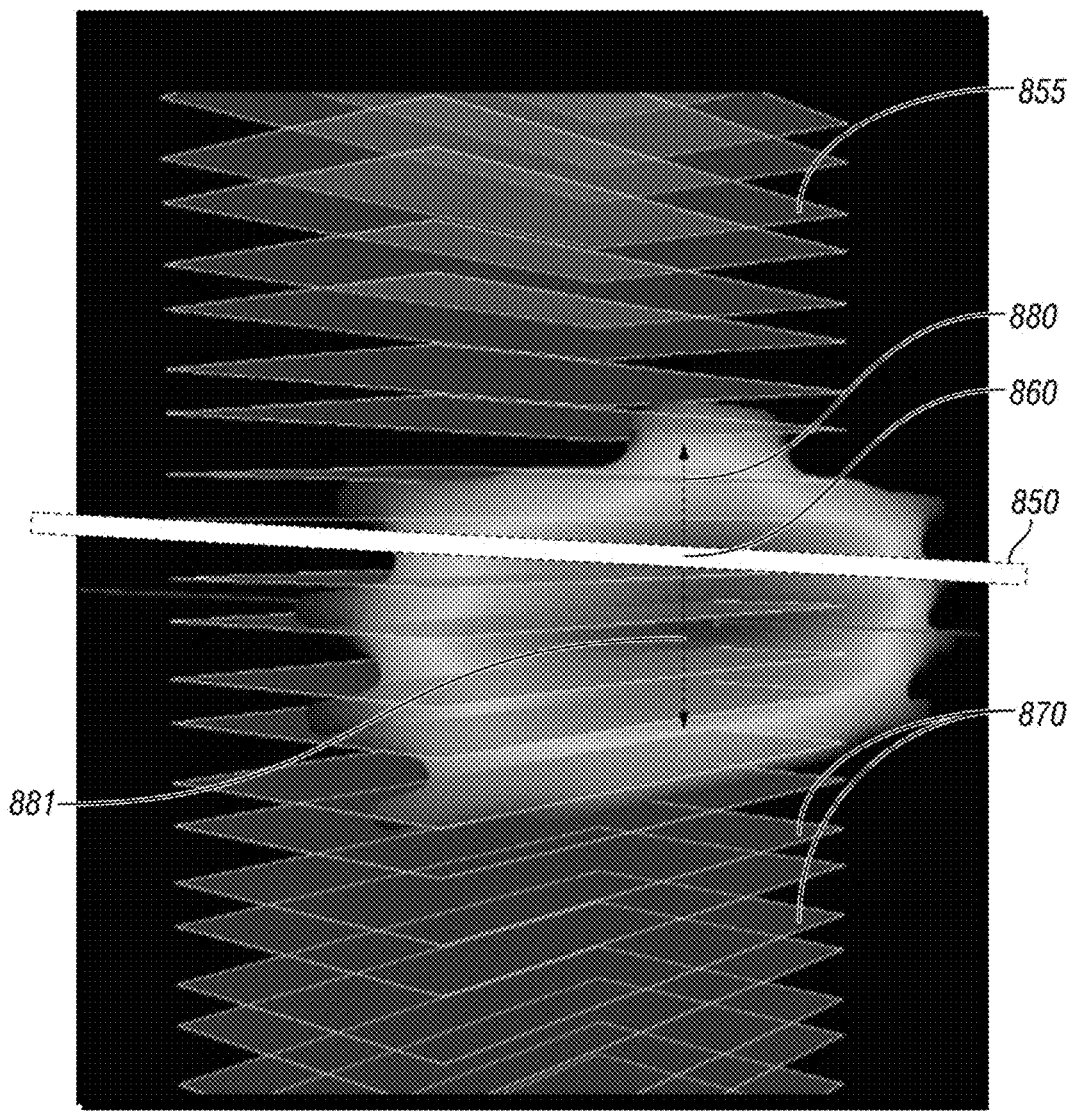
FIG. 10 is a graph of fluid pressure obtained from a hydraulic fracture model showing the effect of thin rock layering on fracture growth.

FIG. 10 shows a hydraulic fracture simulation using high resolution core micro-logger data, to model the effect of thin interfaces on the growth of hydraulic fractures. The layered nature of the rock suppresses the fracture growth and reduces the propped and connected surface area in contact with the reservoir rock. The model comprises a wellbore 850 having a hydraulic fracturing stage 860 (e.g., a perforation) where hydraulic pressure from the wellbore is applied to the rock 855. The model also comprises a set of barriers and thin interfaces 870 having the hydraulic and mechanical properties estimated from the geologic core study, core logging data, layering and interface properties, and optionally open hole logs. The model estimate fracture growth 880, 881 taking into account arrest of fracture propagation caused by 'Class 1' barriers, fracture step-overs, branching, and loss of hydraulic energy caused by 'Class 3' weak planes, and fracture propagation reduction caused by 'Class 4' thin rock layering. Optionally, the model may include may simulate fracture segmentation after fracking taking into account fracture segment isolation caused by 'Class 2' pinch-out points.

Figure 11:
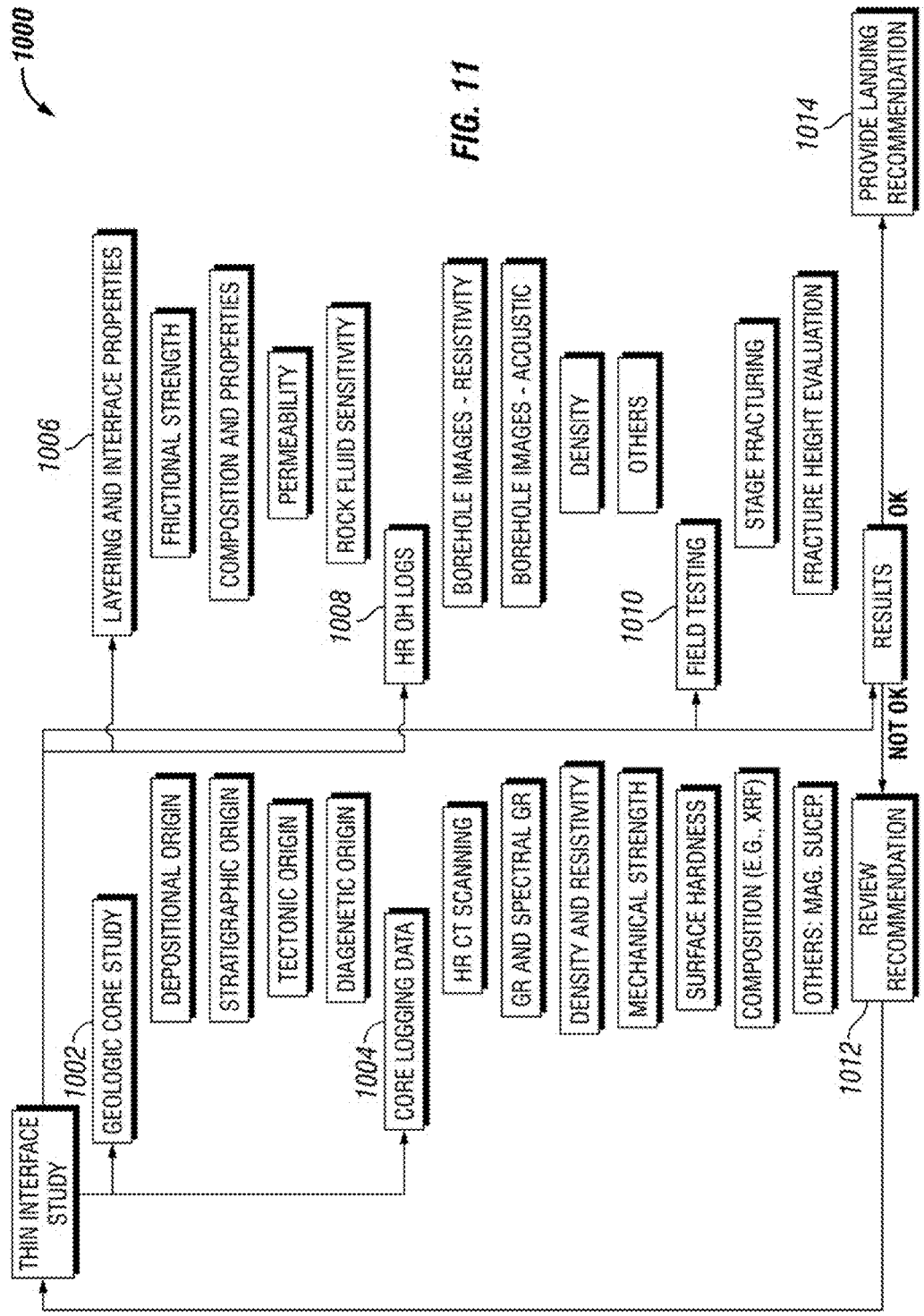
FIG. 11 is a workflow illustrating a method of creating a wellbore landing model in accordance with an embodiment of the present disclosure.

FIG. 11 shows the workflow diagram of a method in accordance with the present disclosure. The method 1000, in a preferred embodiment, includes the following phases.

The method 1000 begins with conducting cm-resolution geologic core study at 1002. A geologic core study is conducted to evaluate the origin, type, density and distribution of thin interfaces and barriers over the interval of interest. Planes of weakness, pinch-out points or thin rock layering can have depositional origin (e.g., ash beds, erosional contacts), stratigraphic origin (bounding surfaces, flooding surfaces), tectonic origin (slickensides, mineralized and non-mineralized fractures), or geochemical origin (fibrous calcite veins, bitumen filled expulsion fractures, or interfaces that change in properties via post depositional geochemical processes of diagenesis). Thus, the method includes conducting a comprehensive study of core geologic facies description, core stratigraphic description and core fracture analysis. Results can be integrated to map the potential thin interfaces and barriers with consequences to hydraulic fracture growth, and to define their geologic context. Understanding the geologic context may be used to predict the pervasiveness of thin interfaces beyond the pilot well under study and along the lateral direction. The core study also enables characterization of these interfaces and barriers, based on their potential for affecting fracture growth. The characterization may include assigning a class or a level of confidence, or both. Tables 1, 2, 3 and 4 describe a classification of fracture barriers and thin interfaces, as well as a ranking based on confidence levels. The geologic core study can also identify core portion locations, for laboratory testing of mechanical strength (friction, cohesion, hardness, and toughness), composition (mineral and organic), and permeability near bed boundaries and thin beds.

The method 1000 also includes obtaining mm- to cm-resolution core logging measurements at 1004. Core logging measurements may include, for example, Gamma Ray, Spectral Gamma Ray, Resistivity, Bulk Density, Acoustic Wave Velocity, Magnetic Susceptibility, Rock Strength and Hardness, X Ray Fluorescence Elemental Composition, Computed Tomography density and Computed Tomography atomic number, and other measurements. The core logging measurements are obtained at millimeter to centimeter resolution to detect the concentration of the layering, changes of properties across rock couplets and interfaces, and the abruptness of transitional nature of the change. Thin interfaces can be identified readily by abrupt changes in material properties or by transitional changes in material properties. The mechanical strength of the thin interfaces (friction angle, toughness, and cohesion) can be tested via on portions of core samples. The test results can subsequently be used to calibrate and better predict the strength of thin interfaces at other core locations using high resolution core logs, and subsequently at non-cored locations, using high resolution open hole logs (including borehole image logs). Thin rock layering, pinch-out points, and weak planes vary in thickness. For example, mineralized fractures and slickensides can be hairline in thickness, and yet have low frictional strength, thus affecting fluid leak off and impairing fracture growth. Ash beds, fibrous veins and bounding units may be from one centimeter (cm) to few centimeters thick. These interfaces are readily detectable during the detailed core study and by the high resolution measurements. Unfortunately, however, they are below the detection resolution of standard logs and thus may be invisible using prior art methods. In this regard, completion design evaluations that are not strongly grounded in thin interface study on core samples, for evaluating the weak fabric of the rock, ignore the primary source of control on fracture growth.

The method 1000 can include determining Layering and Interface properties at 1006, either with laboratory testing, or with predictions based on integrating the study 1002 and measurements 1004 to produce. Integrating results of geologic core study 1002 and high-resolution core logging measurements 1004 provides a detailed evaluation of the presence, density, distribution and typing of the various barriers and thin interfaces present in the core, and their geologic context. It also provides quantitative information for defining locations for laboratory testing of core portions including thin interfaces that have been mapped. The core portions are prepared and used for evaluating interface strength: friction, cohesion, hardness, toughness, and change of these properties as a function of rock-fluid interactions. These core portions can also be used to evaluate the interface (surface) composition: organic, mineral and fluid content, and for evaluating interface permeability. These properties are measured at simulated in-situ conditions, and as a function of increasing confining stress, to evaluate their stress dependence.

The method 1000 can also include integrating the core geologic study 1002 and the core logging measurements 1004 with high-resolution open hole logs 1008. High-resolution open hole logs (e.g., resistivity-based borehole imagers and acoustic-based borehole imagers, bulk density and others) are various measurements used for identifying some of the thin interfaces mapped on the core, once they are correlated or calibrated with the core geologic study 1002 and the core logging study 1004. While some of the interfaces (e.g., ash beds) can be readily detected with some of these high-resolution open hole logs, others (e.g., hairline mineralized fractures and slickensides) are not detectable. Moreover, a combination of high-resolution open hole logs can be correlated with laboratory results of interface strength, to predict the strength of interfaces in regions outside the cored intervals. High resolution logs, after calibration with core logging data and high resolution core description of interfaces, allows extension of the knowledge obtained from the core study to the section of the wellbore not represented with cores, and to other pilot wells without cores. Once the method 1000 has been performed on previous wells, and experience and data exists from these previous wells, it may be possible to calibrate high-resolution logs based on experience and data from the previous wells and thus without the need of additional cores for the new well.

The method further includes field testing 1010. Once barriers and thin interfaces are mapped and characterized within the region under study, hydraulic fracturing modeling and large-block hydraulic fracturing studies can be completed to help validating predictions of fracture growth from multiple potential landing point locations, and predictions of the fracture area segmentation that is caused by the presence of thin interfaces existing above and below each landing depth.

Field testing at 1010 on a vertical well can be conducted to validate the model and generate a landing recommendation at 1014. Perforation locations can be defined and hydraulic fracking can be conducted on vertical pilot wells, for this purpose. Pre- and post-fracturing measurements can be used to evaluate the connected fracture growth (see FIG. 5). These measurements could be logging measurements, fracture tracer measurements, fiber optics measurements, or equivalent. If the results of connected fracture growth conform to the model, the model is validated. If the results do not conform to the model, the model reviewed at 1012, based on the additional information (e.g., by changing the strength of the interfaces), and updated. Fracture stages at various relevant depths are conducted, to verify the model, until this has acceptable conformance with the field observations. The final recommendation is used to define the landing depth of the lateral wellbore, for maximum contact surface area and maximum production.

FIGS. 12A-12E shows an example of data integration and thin interface characterization for evaluation of hydraulic fracturing and recommendation for wellbore placement. Open hole conventional logs (in FIG. 12A) provide the basis for petro-physical interpretations (FIG. 12B) for identifying mineralogy (1211) and reservoir properties (1212), regions with high reservoir quality (1213). Core images and core micro-logs (FIG. 12D) integrate the results of the geologic core study and the core logging measurements. The core images and core micro-logs (FIG. 12D) are used to define the barriers and thin interfaces (in FIG. 12E), including a characterization (1240) and the recommendation of landing location (1245). With data integration, all the logs are aligned and matched in depth (1250, 1251, 1252, 1253 and 1254).

Figure 12A:
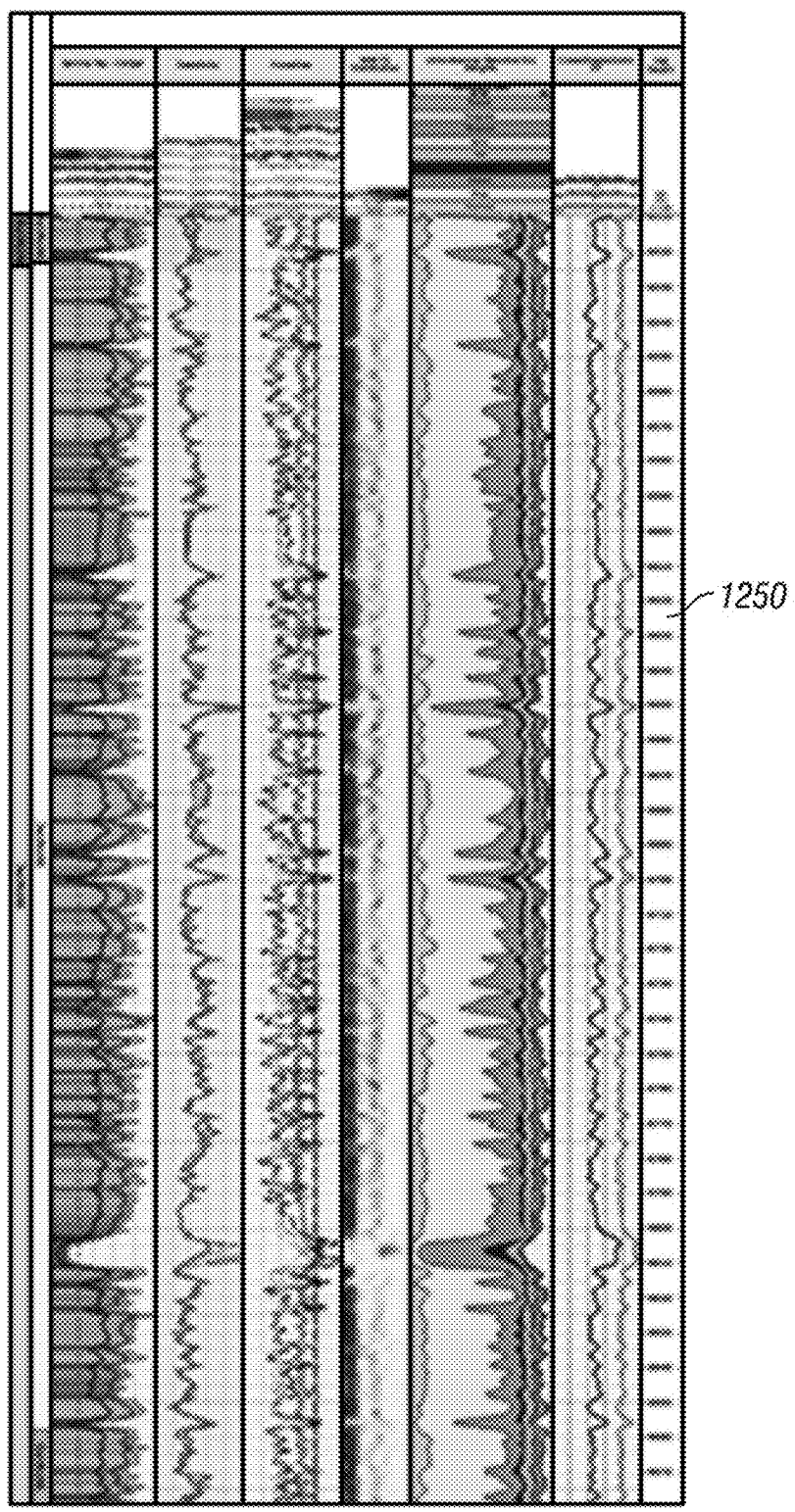
FIGS. 12A-12E show an example data integration and thin interface characterization for evaluation of hydraulic fracturing and recommendation of lateral wellbore placement.
Figure 12B:
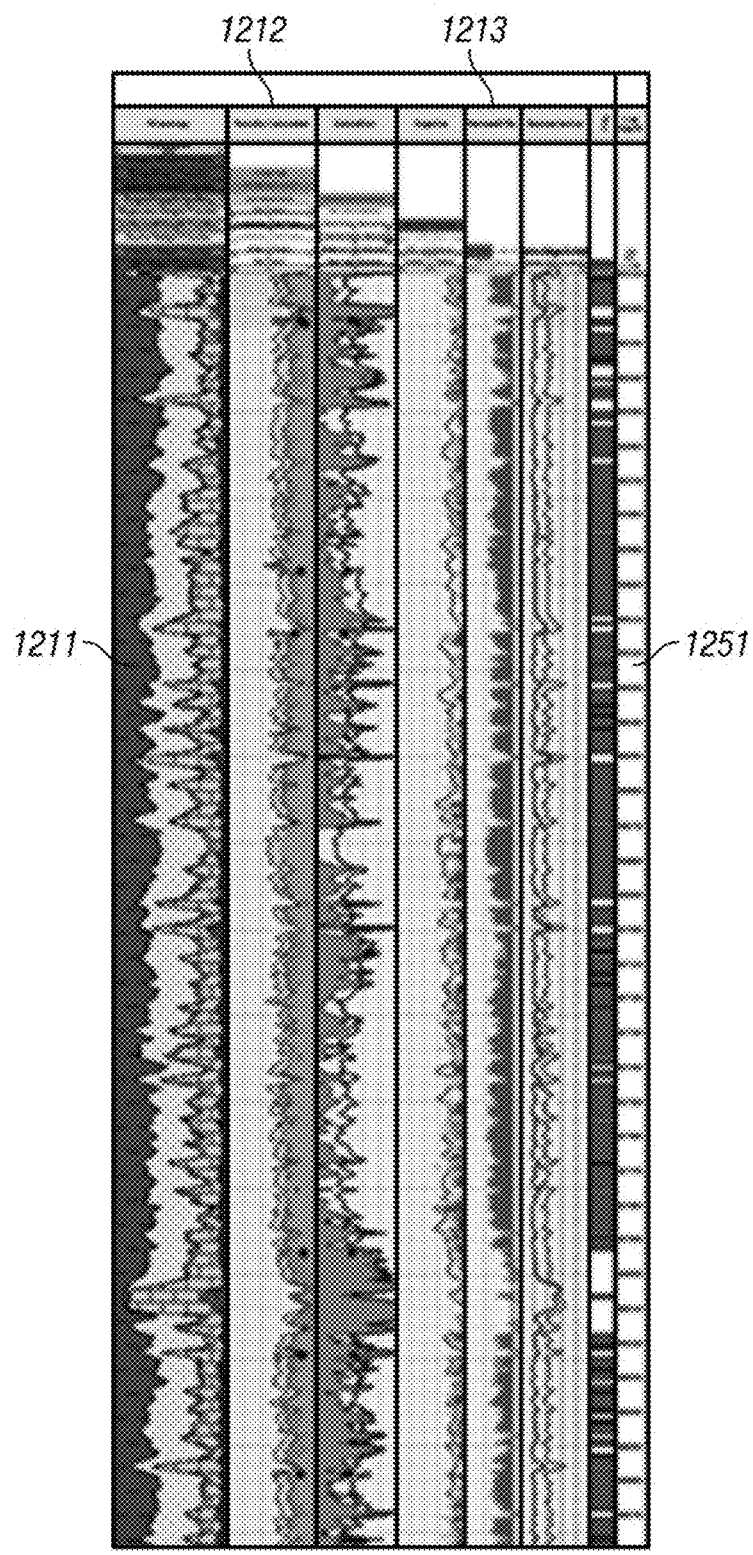
Figure 12C:
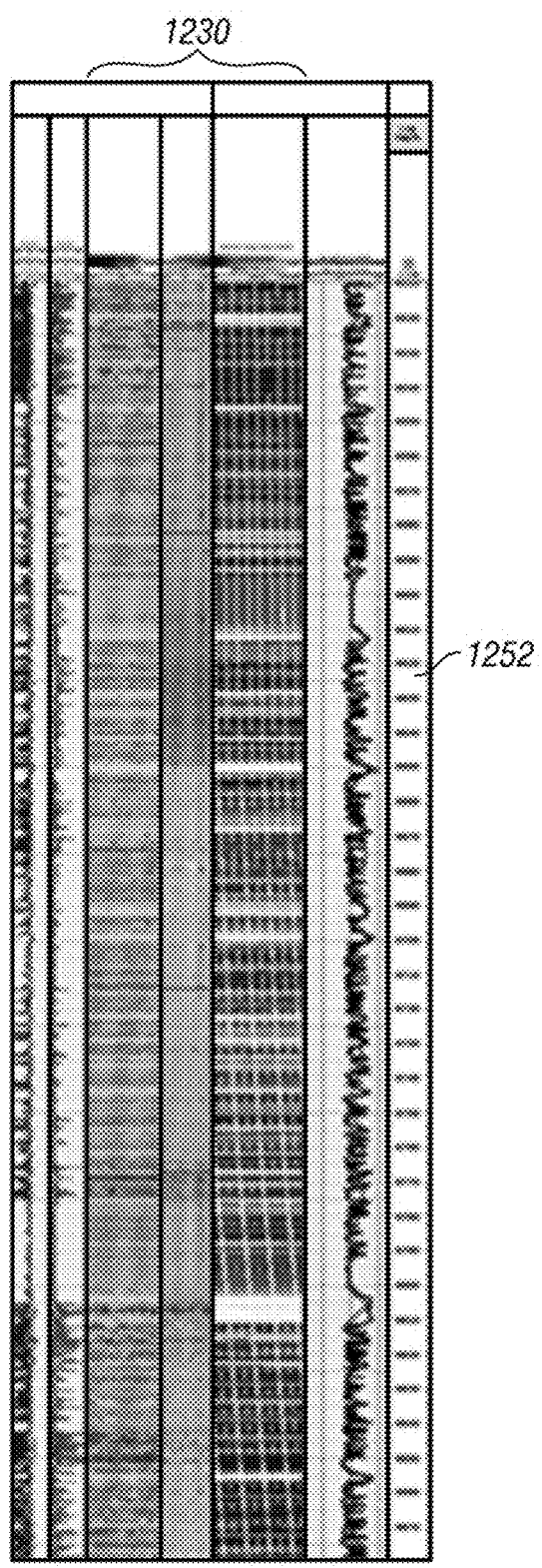
Figure 12D:
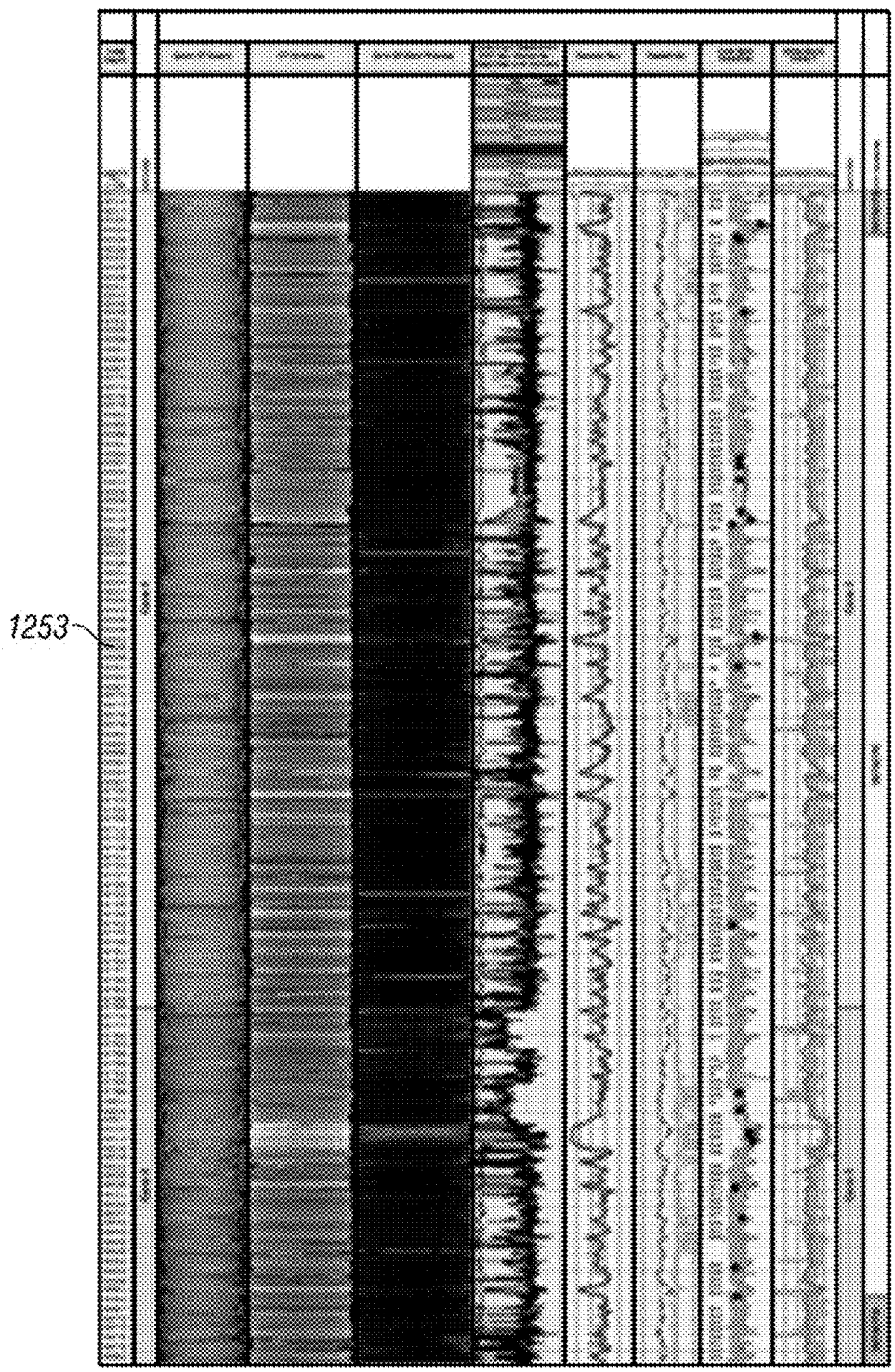

High-resolution borehole-imaging logs (FIG. 12C), for example, including images 1230, for example resistivity images (Oil Based Mud Imager "OBMI") or acoustic images (Ultrasonic Borehole Imager "UBI"), may optionally be further integrated with the core images and core micro-logs (FIG. 12D). Some of the barriers and thin interfaces (FIG. 12E) seen in the core images and core micro-logs (FIG. 12D) can also be seen in the high resolution borehole-imaging logs (FIG. 12C). Thus, by training expert systems (visual or statistical training) to correlate features visible on high resolution borehole-imaging logs to particular classes of thin interfaces. However, other of the barriers and thin interfaces (FIG. 12E) seen in the core images and core micro-logs (FIG. 12D) may not be seen in the high resolution borehole-imaging logs (FIG. 12C). Thus, the adequacy and limitations of the trained expert systems is readily apparent in the integration of the high-resolution borehole-imaging logs (FIG. 12C), the core images and core micro-logs (FIG. 12D), and the barriers and thin interfaces (FIG. 12E).

Figure 12E:
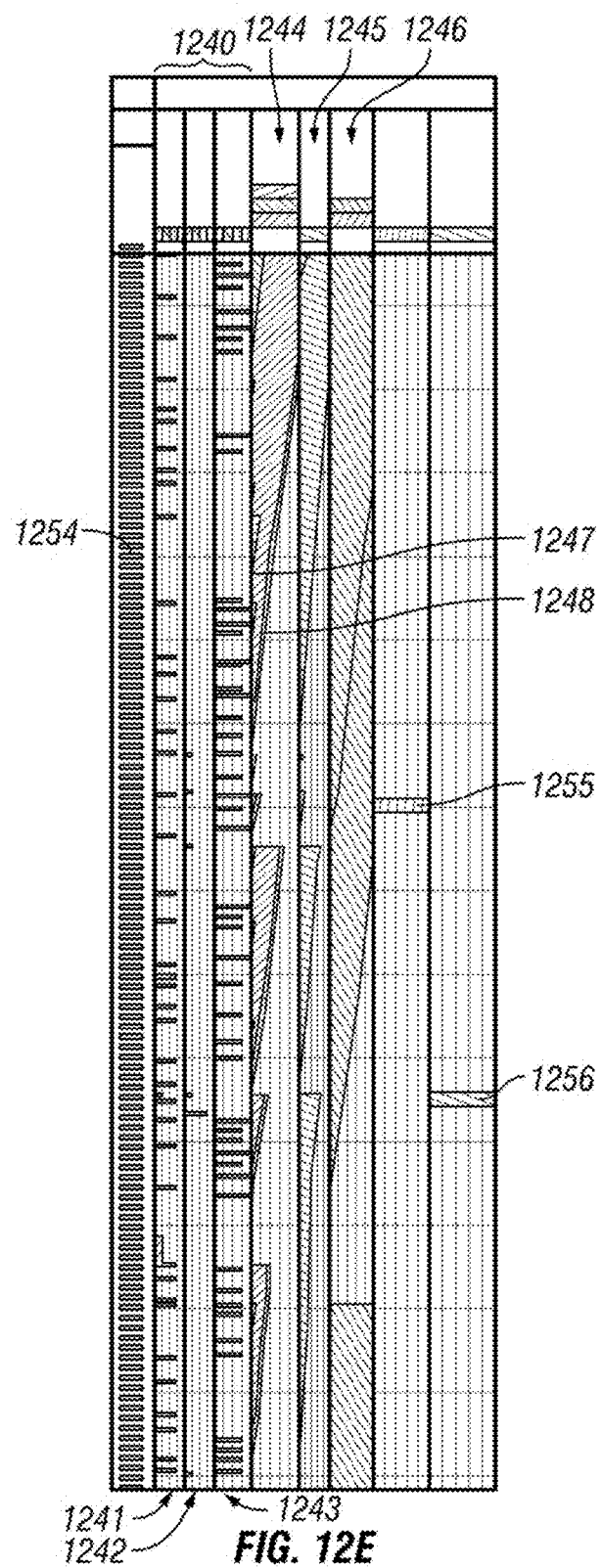

Turning now to FIG. 12E, the locations of barriers 1241 ('Class 1'), and thin interfaces (1242 for 'Class 2', 1243 for 'Class 3', and optionally 'Class 4') are represented in the integrated display. This portion of FIG. 12E may be similar to the visual display of thin interface mapping and characterization shown in FIG. 9.

The production potential is further evaluated from a cumulative value of hydrocarbon filled porosity $S_o \Phi h$. In the absence of barriers or thin interfaces, the cumulative hydrocarbon filled porosity will increase continuously with h, the thickness of the reservoir. In the presence of barriers and thin interfaces, the cumulative value is re-set to zero at every barrier; therefore the cumulative value of hydrocarbon filled porosity $S_o * \Phi \Delta h$ is discontinuous at every location where a 'Class 1', 'Class 2', 'Class 3' or 'Class 4' barrier or interface confidence level is such that the barrier or interface is expected to limit the hydraulic fracture growth or create pinch-out points. The small triangular shapes of the cumulative reservoir volume $S_o \Phi \Delta h$ that are shown in FIG. 12E increase continuously in height up to the depth at which the barrier or thin interface is expected to impede a hydraulic fracture to grow from a region below the barrier or thin interface into a region above the barrier or thin interface. The cumulative value of hydrocarbon filled porosity $S_o \Phi \Delta h$ is re-set then back to zero at the location of the barrier or thin interface. In the example of FIG. 12E, the cumulative hydrocarbon filled porosity is evaluated for the 'Class 1' interfaces in 1244, for the 'Class 2' interfaces in 1245, and for the 'Class 3' interfaces in 1246.

Further, for each class, the cumulative hydrocarbon filled porosity is evaluated taking into account the interfaces or barriers ranked 'L3' or below (see 1247 for example). This is a conservative estimate of the production potential because it assumes that even if interfaces or barriers have a low level of confidence, these interfaces or barriers will impede efficient hydraulic fracturing of the reservoir. The cumulative hydrocarbon filled porosity is also evaluated taking into account the interfaces or barriers ranked 'L2' or below (see 1248 for example). This is a less conservative estimate of the production potential because it assumes that interfaces or barriers need at least a medium level of confidence to impede efficient hydraulic fracturing of the reservoir. The cumulative hydrocarbon filled porosity may also be evaluated taking into account the interfaces or barriers ranked 'L1'. The integrated display of the production potentials shows how the production potential varies with the spacing between the interfaces from each class and with the depth 1254. The range of the $S_o \Phi \Delta h$ plots is set to the value above which production will lead to a profitable well. Thus, if the cumulative value, before resetting does not reach to the maximum range of the plot, one news to connect one or more barriers to be profitable. If the cumulative value wraps up after reaching the maximum range and before resetting, one can produce economically from that segment alone, without the need to connect reservoir compartments. Optimal wellbore placement may be selected as the location that will maximize the connectivity between interfaces and maximize the production potential, above the set limit of required of $S_o \Phi \Delta h$ for economic production. Examples of these locations are provided at 1255 (first choice) and at 1256 (secondary choice). In both cases, it is recommended that the wellbores should be landed in close proximity to Class 1 interfaces, to connect one or more reservoir segments.

Figure 13:
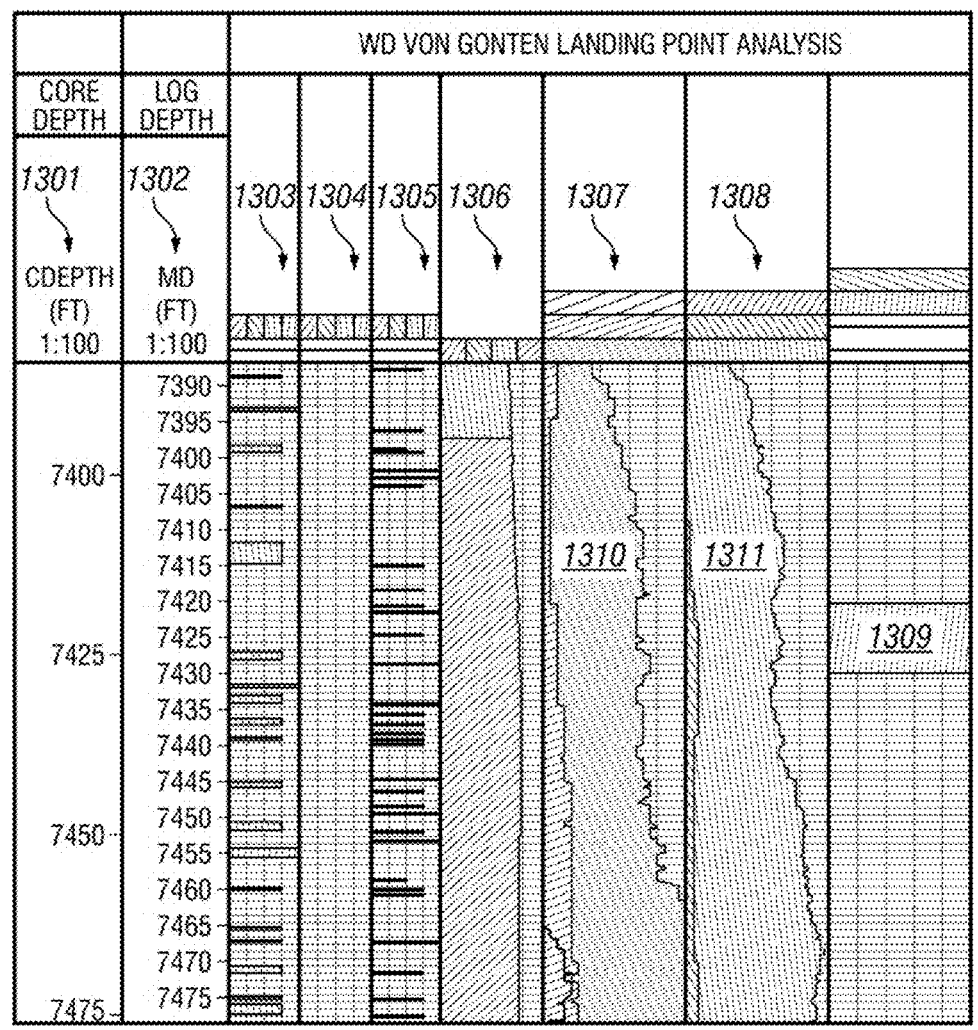
FIG. 13 shows another example of thin interface characterization for evaluation of hydraulic fracturing and recommendation for wellbore placement.

FIG. 13 shows and alternative display of the including characterization of barriers and thin interfaces and the recommendation of landing location shown in FIG. 12E. Again, the presence and distribution of barriers 1303 in 'Class 1', pinch-out points 1304 in 'Class 2', and weak planes 1305 in 'Class 3' are provided as a function of depth (1301 or 1302). The production potentials corresponding to classification of the barriers and thin interfaces, computed continuously at every point as the cumulative values of hydrocarbon filled porosity $S_o \Phi \Delta h$ over a 100 feet above and 50 feet below the given depth interval is shown in track 1306. The desired cumulative value for economic potential is shown in green. In this example almost any location along the region of interest (except the region in orange) will yield economic production if the fracture propagates over at least 150 feet height. FIG. 13 shows that the impediments created by 'Class 1' barriers 1307 and 'Class 3' thin interface 1308 are the most important to overcome. Similarly to the previous (1306), the continuous value of the cumulative number of interfaces and barrier over 100 feet above and 50 feet below the given depth interval is calculated for Class 1 L1 barriers (1310) and Class 3 L3 barriers (1311). The other levels are also calculated.

A wellbore landing location 1309 that will satisfy the condition of $S_o \Phi \Delta h$ while minimizing the cumulative density on fracture barriers of Class 1 and Class 2 is recommended. To achieve economic production after fracking, the created fracture need to grow from the recommended wellbore landing location through a region with the desired $S_o \Phi \Delta h$ at least 150 feet, and connect the region to the wellbore landing location.

Figure 14:
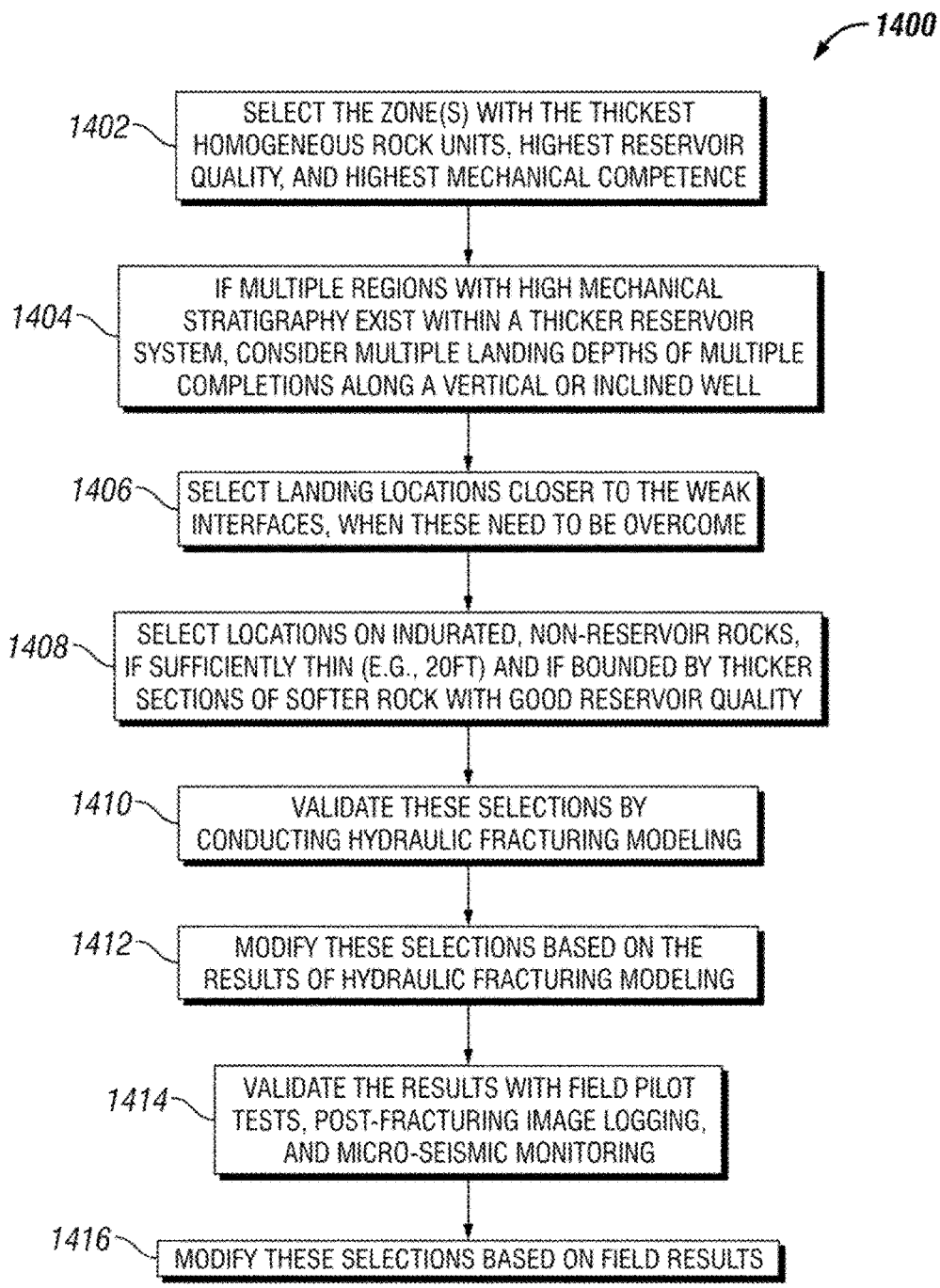
FIG. 14 is a workflow illustrating another method of creating a wellbore landing model in accordance with an embodiment of the present disclosure.

The resulting connected surface area connectable to each landing point location via a hydraulic fracture created from that particular landing point location can be used to evaluate the potential productivity of the well as a function of the landing location vis a vis the desired targets for profitable well production. The potential productivity of the well evaluated in this way as a function of the landing location is thus affected by thin interfaces. The potential productivity of the well as a function of the landing location may be used to generate a landing location recommendation. FIG. 14 shows an example of such analysis and recommendation using method 1400. Uncertainties in the recommendation may be associated to uncertainties in the available data (e.g., uncertain pore pressure, uncertain in-situ stress), uncertainty in the applicability of the study to a well distant from the cored well, or uncertainty in other reasons.

At step 1402, one or more zone (s) with the thickest homogeneous rock units, highest reservoir quality, and highest mechanical competence are selected based on petrophysical interpretations such as shown in FIG. 12B.

At step 1404, a determination of whether multiple potential landing locations (or landing depths) for multiple completions along a vertical or inclined well are considered is made if multiple regions with high mechanical stratigraphy exist within a thicker reservoir system.

At step 1406, potential landing locations (or landing depths) are selected closer to the thin interfaces that need to be traversed by hydraulic fractures.

At step 1408, potential landing locations (or landing depths) are selected on indurated, non-reservoir rocks, when the non-reservoir rocks are sufficiently thin (e.g., 20 feet) and bounded by thicker sections of softer rock with good reservoir quality.

At step 1410, the selected landing locations (or landing depths) may be validated by estimating the growth of hydraulic fractures across the multiple barriers and thin interfaces, and the connectivity of the resulting fracture surface areas. The growth of hydraulic fractures and the connectivity of the resulting fracture surface areas may be estimated using hydraulic fracturing modeling, or other heuristic approach based on the ranking of the barriers and thin interfaces in different confidence levels and the distance the landing location and the barriers and thin interfaces.

At step 1412, the potential landing locations (or landing depths) selected at steps 1406 and 1408 may be dropped, or otherwise modified based on the validation performed at step 1410. For example, if results of hydraulic fracturing modeling show that thin interfaces that need to be traversed by hydraulic fractures are not traversed, the landing locations (or landing depths) may be selected closer to the thin interfaces that need to be traversed by hydraulic fractures.

At step 1414, the growth of hydraulic fractures across the multiple barriers and thin interfaces, and the connectivity of the resulting fracture surface areas estimated at step 1410 may be validated with field pilot tests, post-fracturing image logging as explained in the description of FIG. 5, and micro-seismic monitoring, among other techniques.

At step 1416, the potential landing locations (or landing depths) selected at steps 1406 and 1408, and optionally modified at step 1412 may be further refined based on field results obtained at step 1414.

Figure 15:
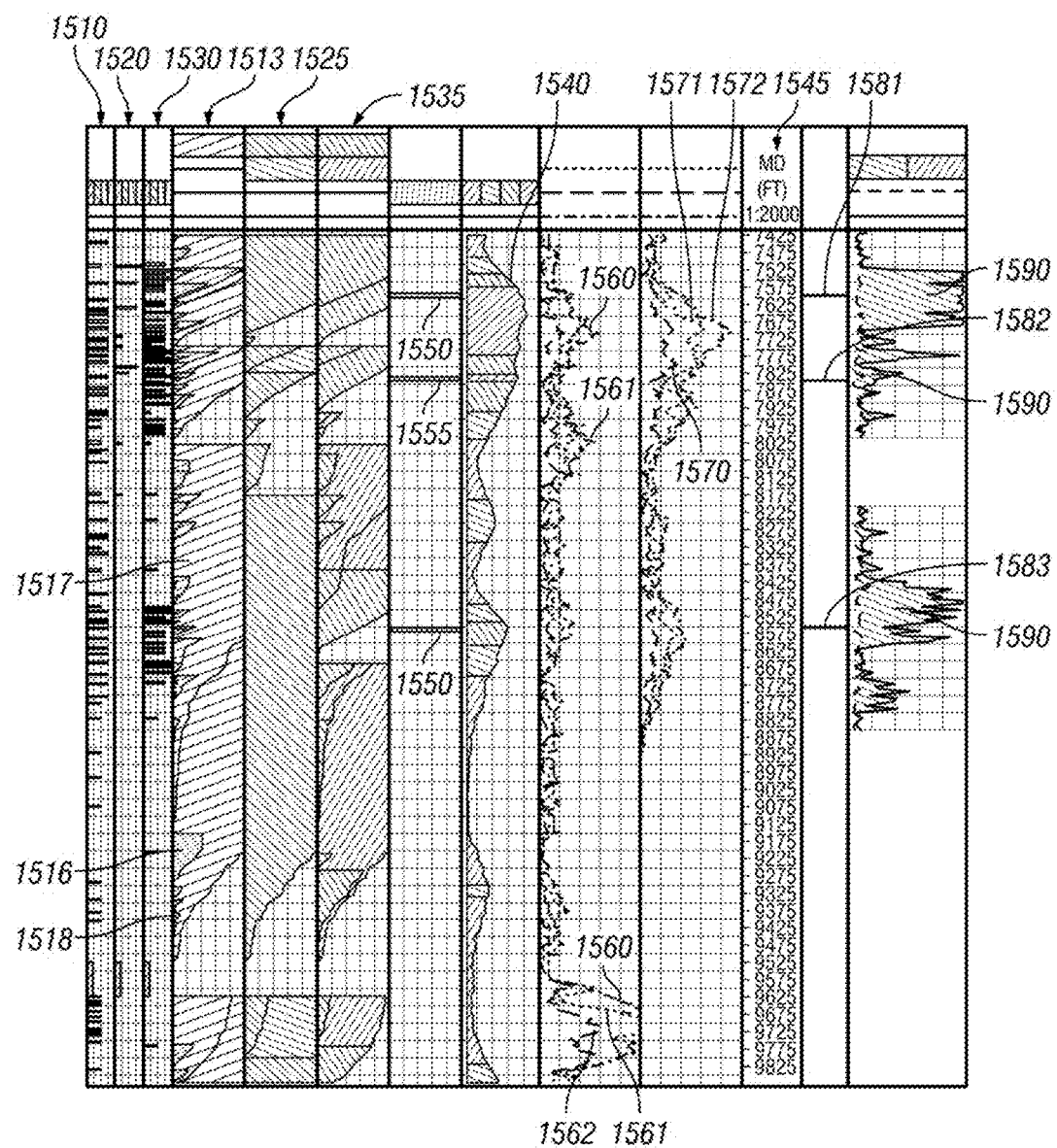
FIG. 15 is an integrated display of reservoir quality and number of thin interfaces that may be used for generating a landing recommendation.

FIG. 15 shows an integrated display that may be used as an alternative of the integrated display shown in FIG. 12E. One difference in the display is that the effect of barriers and thin interfaces on fracture propagation is visualized as a running average calculated at every possible landing location. The running average is calculated over a selected compartmentation height (e.g., 150 feet). The compartmentation height may be selected to correspond to an anticipated fracture growth estimated as if the barriers and the thin interfaces did not exist. The compartmentation height may be selected to correspond to the distance between fracture barriers, any distance over which fractures are anticipated to grow. The compartmentation height may be selected to correspond to the distance of fracture growth predicted by numerical simulation. The compartmentation height may be selected to correspond to field evaluation with dipole sonic tool. The averaging may by uniformly weighted, weighted as a function of the confidence level, weighted as a function of the distance between the landing location and the location of the barriers or thin interfaces, or a combination of these and other weighting techniques. This graphical display may be effective for visual evaluation of the optimal landing location.

'Class 1' fractures barriers, and 'Class 2' and 'Class 3' thin interfaces, mapped and characterized using one or more of the methods described herein are shown in log tracks 110, 1520, and 1530.

A calculated reservoir quality, for example cumulative hydrocarbon filled porosity (HFP) is plotted in separate tracks 1515, 1525, and 1535 for the various barrier and thin interface classes 'Class 1', 'Class 2', 'Class 3', respectively. To predict the effect of the presence of the fracture barriers and thin interfaces on fracture growth and fracture connectivity, and each separate track 1515, 1525, and 1535 includes several curves. The first curve (e.g., 1516) is discontinuous at the locations of fracture barriers or thin interfaces having any level of confidence 'L1', 'L2', or 'L3'. The second curve (e.g., 1517) is discontinuous only at the locations of fracture barriers or thin interfaces having a level of confidence 'L1', or 'L2', that is, medium or high. The third curve (e.g., 1518) is discontinuous only at the locations of fracture barriers or thin interfaces having a level of confidence 'L1', that is, high.

An averaged hydrocarbon filled porosity (HFP) is evaluated continuously at every possible landing locations. The running average is calculated over a selected compartmentation height (e.g., 150 feet). The compartmentation height may be select to correspond to an anticipated fracture growth estimated as if the barriers and the thin interfaces did not exist. In this example, the fracture was anticipated to have more upward growth (e.g., 100 feet) and less downward growth (e.g., 50 feet). Thus, in the example shown, the averaged HFP is calculated over a compartment height of 150 feet, 100 feet up and 50 feet down, and the averaging is uniformly weighted over the selected compartmentation height. A curve 1540 plots the average of HFP as a function of depth 1545, The curve 1540 provides an estimation of production potential enhanced via hydraulic fracturing, provided that there is no impediment of fracture growth by barriers or thin interfaces. The area under the curve 1540 may be colored to indicate a comparison of the average HFP with threshold values of the HFP associated with minimum production level to make production economical, desired production level, etc.

Averaged number fracture barriers and thin interfaces may be calculated continuously, within the same compartmentation height selected for the estimation of production potential. Curves may be plotted for every fracture barrier class and then consolidated to provide a single cumulative curve. These is done adding the cumulative curves of interfaces with the same level of risk and heuristically using multiplying factors to convert a lower level of confidence into a higher one, given a larger number of lower confidence barriers per unit length. Alternatively, one develops this equivalence via mechanical testing and hydraulic fracturing laboratory tests, to evaluate how many lower level confidence interfaces per unit length of core would represent a higher level of confidence. Once all the classes have been transformed to the same higher level of confidence, they can be added arithmetically to represent the total risk curve. In the example shown in FIG. 15, two tracks are shows, analyzing respectively the 'Class 1' barriers having a 'L2' confidence level, and 'Class 1' barriers having a 'L3' confidence level. The first track contains three curves 1560, 1561, and 1562. The values for the curve 1560 are calculated using averaging with uniform weights. The values for the curves 1561 and 1562 are calculated using averaging with weights that take into account the increasing hydraulic energy that would be available near each possible landing location by reducing the effect of the barriers near each possible landing location. Similarly, the second track contains three curves 1572, 1571, and 1570, calculated using averaging with the same weights as curves 1560, 1561, and 1562.

Thus, the three curves may be used to provide landing recommendations associated with a level of risk tolerance. Landing recommendations associated with a low level of risk tolerance may be provided by using curve 1560, and landing recommendations associated with higher level of risk tolerance may be provided by using curve 1560, and 1561.

A recommended landing location(s), generated using for example method 1400 is(are) shown at 1550, (and 1555). The recommended landing location(s) are generated by predicting the development of hydraulic surface area in the region with high HFP, taking into account the effect on fracture propagation of density of fracture barriers plotted in curves 1560, 1561, 1562, 1572, 1571, and 1570 or other curves derived therefrom. Depending on the data available and the time required to complete the recommendation, the method of generating the recommended landing location(s) may use hydraulic fracture propagation models, or experimental results from multiple previous hydraulic fracture propagation field tests, or an integrated display of the curves 1540 and one or more of the curves 1560, 1561, 1562, 1572, 1571 or 1570, or similar curves.

Once the landing recommendations are selected, the methods 1000 or 1400 involve field testing in vertical pilot wells to validate the prediction of hydraulic fracture growth. Field testing may involve perforating at locations 1581, 1582, and 1583 and hydraulic fracturing the vertical well at the perforating at locations 1581, 1582, and 1583. Measurements performed as part of the evaluation of the field test may either confirm that the predicted fracture growth and thus the landing recommendation may be validated, or provides new information for modifying the landing recommendation. In the above example, the landing recommendations 1550 are validated with the measurement of hydraulic conductivity 1590, because these recommendations provide sufficient fracture growth for achieving economical production. However, the landing recommendation 1555 would not be validated. Although the landing recommendation 1555 correspond to a large averaged HFP (see curve 1540), it was located in a region flanked with high densities of fracture barriers (see curve 1560 or 1572). The fracture growth was questionable. The measurement of hydraulic conductivity 1590 confirms poor fracture growth development.

Figure 16A:
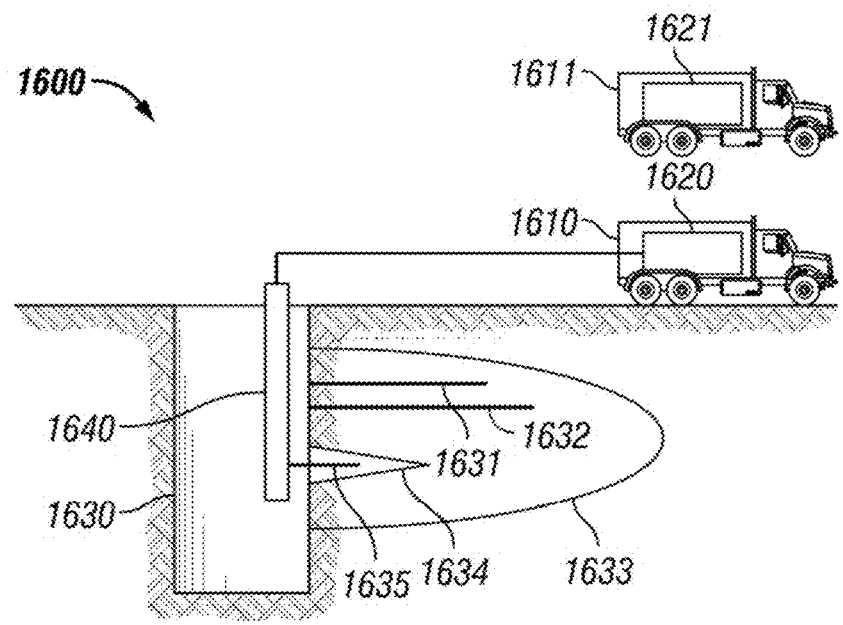
FIG. 16A is a view of a system for creating a wellbore landing model.

FIG. 16A is a view of a system 1600 in accordance with the present disclosure. The system 1600 comprises a surface unit 1610 including a computing system 1620, and a tool unit 1640 disposed in a wellbore 1630. The wellbore 1630 as shown is drilled through formations, and intersect thin interfaces 1631, and 1632, among other interfaces.

The tool is configured to measure hydraulic conductivity of a fracture 1633 created by fracturing the wellbore at perforation location 1634. Hydraulic conductivity may be measured using the difference between dipole shear sonic log as described in FIG. 5. Alternatively hydraulic conductivity may be measured using radioactive proppants during hydraulic fracturing, and then measure where the radioactive proppants are the reservoir. For example, hydraulic fracturing may be performed with Portland cement tagged with radioactive tracers. Then a radioactivity level measurement may be used to determine where the cement is filling the fracture. Hydraulic conductivity may be measured with any other measurement of fracture aperture along the wellbore.

The system also includes a coring truck 1611 and a core logging apparatus 1621. The core logging apparatus may be used to map interfaces and thin layering that is otherwise invisible to the open hole logs.

Figure 16B:
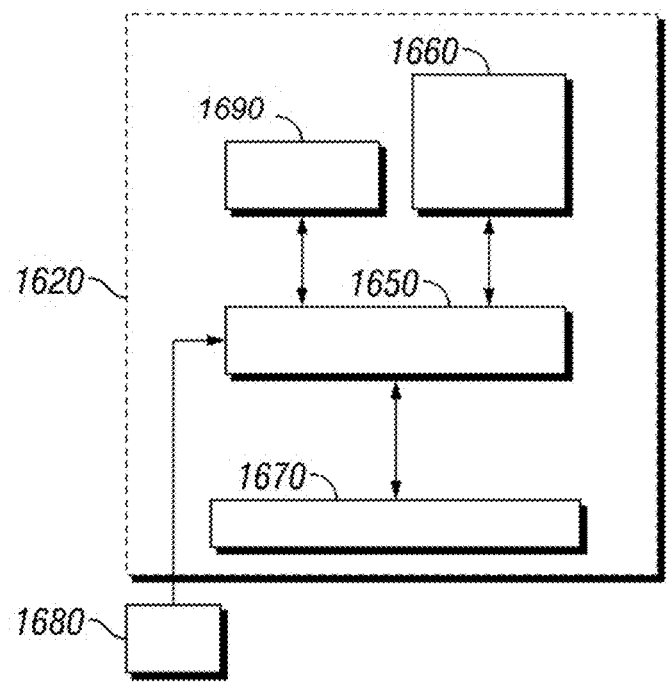
FIG. 16B is a view of a portion of the system for creating a wellbore landing model shown in FIG. 16A.

FIG. 16B is a view of a portion of the system 1600. The computing system 1620 includes a processor 1650 that reads and executes instructions stored on a computer readable storage medium 1670. The instructions, when executed, cause the processor 1650 to perform one or more steps of a method disclosed herein, such as method 1000 or 1400. In an example, the instructions, when executed, cause the processor to generate integrated displays on screen 1690, such as exemplified in FIG. 12A-12E, 13, or 15. In an example, the instructions, when executed, cause the processor 1650 to generate a model 1660 based on mapping of thin interfaces and landing recommendations, such as a model shown in FIG. 10. In an example, the instructions, when executed, cause the processor to validate the model 1660 with the measurement of hydraulic conductivity 1680, communicated by the tool 1640.

In an embodiment, a method is disclosed. The method can include obtaining a core sample in a wellbore. The method can also include conducting a geologic core study on the core sample to evaluate at least one fracture barrier over an interval of interest, for example a plane of weakness or a section with thin rock layering. The method can also include conducting core logging measurements on the core sample. The method can also include identifying at least one fracture barrier based on integrating the geologic core study and the core logging measurements.

In an embodiment, a computer readable storage medium stores instructions for creating a wellbore landing model, the instructions when executed causing a processor to receive measurements relating to a geologic core study on a core sample from a wellbore to evaluate at least one fracture barrier over an interval of interest, for example a plane of weakness or a section with thin rock layering. The instructions further cause the processor to receive core logging measurements on the core sample, and identify at least one fracture barrier based on integrating the geologic core study and the core logging measurements.

In an embodiment, a system is disclosed for creating a wellbore landing model. The system can include a tool and a surface unit. The tool can be configured to obtain a core sample in a wellbore. The surface unit can include a processor configured to receive measurements relating to a geologic core study on a core sample from a wellbore to evaluate at least one fracture barrier over an interval of interest, for example plane of weakness or section with thin rock layering. The processor can also be configured to receive core logging measurements on the core sample. The processor can also be configured to identify at least one fracture barrier based on integrating the geologic core study and the core logging measurements. The processor can also be configured to generate a landing recommendation based on a classification of the at least one fracture barrier (e.g., interface or section with thin rock layering). The processor can also be configured to generate a wellbore landing model based on the identified fracture barrier and the landing recommendation. The tool may be further configured to perform hydraulic fracture simulations, field verification, and field operation based on the wellbore landing model.

In an embodiment, the present method is directed to defining and optimizing the landing depth of horizontal wellbores, for improved well productivity and profitable production, based on evaluating thin rock layering concentration and weak planes in reservoir rocks with complex fabric, which interfere with hydraulic fracture growth; evaluating the resulting connected surface area of hydraulic fractures, and the associated productivity of each connected section. Evaluating the production potential along multiple potential landing depths provides a method for identifying locations with poor economic potential, high economic potential, and among the latter, the location providing highest productivity and economic returns.

In an embodiment, the present method is directed to defining thin rock layering concentration and planes of weakness on reservoir rocks with complex rock fabric based on geologic core studies and integration with core logs and high resolution well logs in pilot wells. The method enables the prediction of thin rock layering and weak planes: depositional, stratigraphic, tectonic, digenetic, and understanding of the pervasiveness or lack of pervasiveness away from the pilot wells.

In an embodiment, the present method is directed to measuring the concentration and properties of thin rock layering and weak planes defined by the previous study: their strength, composition (mineral and organic content), and permeability, as a function of in-situ stress.

In an embodiment, the present method is directed to integrating geologic observations, high-resolution core logging measurements, and measuring thin rock layering concentration and weak-plane properties with high resolution well logs, to propagate the learnings of the study to other wells without core. The present method may include training an expert system on high resolution core logging measurements to recognize these thin rock layering concentration and weak-plane properties on high resolution well logs. The trained expert system may be used on other wells with high resolution logs but no core.

In an embodiment, the present method is directed to defining and differentiating multiple types fracture barriers ('Class 1', 'Class 2', 'Class 3', and 'Class 4'), in relation to their effect and certainty on hydraulic fracture growth impediment, along the wellbores under study.

In an embodiment, the present method is directed to evaluating the connected fracture growth and connected surface area that is possible at one or more optional landing depths, in relation to the presence concentration and distribution of fracture barriers 'Class 1' through 'Class 4' and including thin rock layering and various planes of weakness in the system.

In an embodiment, the present method is directed to calculating the production potential for the connected surface area from each of the optional landing locations.

In an embodiment, the present method is directed to displaying the cumulative production associated to this option and provides a visual indication of the optimal location.

In an embodiment, the present method is directed to testing the validity of the model, or for better adapting the model to unknown conditions in the reservoir, by conducting hydraulic fractures on vertical pilot wells, measuring the connected fracture growth at the wellbore, and comparing these observations with predictions by the model.

In an embodiment, the present method is directed to a workflow that integrates various observations, including field tests, to iterate a best model representing fracture growth on rocks with complex fabric, and provides optimal recommendations for lateral landing depths.

The method includes evaluating one or more sections with thin rock layering or planes of weakness in the system that may impair hydraulic fracture growth or may close fractured sections during production. The method can include conducting detailed analysis on core and open hole wireline logs, and defining the presence, concentration, orientation, spacing, and mechanical properties of thin rock layering and the various planes of weakness in the rock mass. The method can include grouping these types of fracture barriers in classes ('Class 1', 'Class 2', 'Class 3', and 'Class 4') based on their effect on impairing hydraulic fracture growth and on our certainty of their effect on fracture growth. The method can include integrating this information and calibrating high resolution wireline open hole logs to the core information, to propagate the learnings of the study to other wells with high resolution logs but without core. The method can include modeling the effect of these interfaces on hydraulic fracturing, and evaluating the production potential of the connected surface area along multiple potential landing point locations. The method can include comparing these results to evaluate landing locations resulting in either poor or high economic potential, based on the resulting connected surface area. The method can include selecting among the possibilities, the location with highest production potential and economic returns.

What is claimed is:

1. A method for selecting a landing point, comprising:
conducting a geologic core study on a core sample obtained in a wellbore;
conducting core logging measurements on the core sample;
mapping fracture barriers based on an integration of the geologic core study and the core logging measurements;
selecting a compartmentation height that corresponds to a fracture growth predicted by simulation as if the fracture barriers did not exist, a fracture growth evaluated in a field, or a distance between a subset of the fractures barriers;
determining an average hydrocarbon filled porosity over the compartmentation height as a function of depth within the wellbore;
determining an average number of fracture barriers over the compartmentation height as a function of depth within the wellbore; and
selecting a landing point at a depth having a maximized averaged hydrocarbon filled porosity and a minimum averaged number of fracture barriers.

2. The method according to claim 1, further comprising integrating the geologic core study, the core logging measurements, and a high resolution open hole log.

3. The method according to claim 2, further comprising:
training an expert system on the geologic core study and the core logging measurements to recognize the fracture barriers on the high resolution open hole log; and
using the trained expert system on a second high resolution open hole log from a second wellbore.

4. The method according to claim 1, further comprising classifying the fracture barriers as one of:
a thick lithologic barrier that arrests fracture height growth;
a pinch-out point that isolates fracture segments;
a plane that generates fracture step-overs, branching or loss of hydraulic energy; or
thin rock layering that reduces fracture growth.

5. The method according to claim 1, further comprising:
integrating the averaged hydrocarbon filled porosity and the averaged number of fracture barriers.

6. The method according to claim 1, further comprising assigning a confidence level to the fracture barriers.

7. The method according to claim 6, further comprising adjusting the confidence level based on a proximity of the fracture barriers to perforation stages or a density of fracture barriers.

8. The method according to claim 1, further comprising predicting fracture growth based on the mapping of the fracture barriers.

9. The method according to claim 1, further comprising:
generating a model based on the mapping of the fracture barriers and the selected landing point;
conducting hydraulic fracturing simulations to test the model; and
field testing to validate the model.

10. A non-transitory computer readable storage medium storing instructions:
the instructions, when executed, causing a processor to receive measurements relating to a geologic core study on a core sample from a wellbore;
the instructions, when executed, causing the processor to receive core logging measurements on the core sample;
the instructions, when executed, causing the processor to map fracture barriers based on integrating the geologic core study and the core logging measurements;
the instructions, when executed, causing the processor to select a compartmentation height that corresponds to a fracture growth predicted by simulation as if the fracture barriers did not exist, a fracture growth evaluated in a field, or a distance between a subset of the fractures barriers;
the instructions, when executed, causing the processor to determine an average hydrocarbon filled porosity over the selected compartmentation height,
the instructions, when executed, causing the processor to determine an average number of fracture barriers over the selected compartmentation height, and
the instructions, when executed, causing the processor to select a landing point at a depth having a maximized averaged hydrocarbon filled porosity and a minimum averaged number of fracture barriers.

11. The computer readable storage medium according to claim 10, further storing instructions:
the instructions, when executed, causing the processor to integrate the geologic core study, the core logging measurements, layering and interface properties, and a high resolution open hole log.

12. The computer readable storage medium according to claim 10, further storing instructions:
the instructions, when executed, causing the processor to classify the fracture barriers as a thick lithologic barrier that arrests fracture height growth, a pinch-out point that isolates fracture segments, a plane that generates fracture step-overs, branching or loss of hydraulic energy, or thin rock layering that reduces fracture growth.

13. The computer readable storage medium according to claim 10, further storing instructions:
the instructions, when executed, causing the processor to integrate the averaged hydrocarbon filled porosity and the average number of fracture barriers.

14. The computer readable storage medium according to claim 10, further storing instructions:
the instructions, when executed, causing the processor to generate a model based on mapping of the fracture barriers and on the selected landing point; and
the instructions, when executed, causing the processor to validate the model based on a plurality of measurements obtained in a field test.

15. The computer readable storage medium according to claim 10, further storing instructions:
the instructions, when executed, causing the processor to predict fracture growth based on mapping the fracture barriers.

16. The computer readable storage medium according to claim 15, further storing instructions:
the instructions, when executed, causing the processor to assign a confidence level to the fracture barriers based on the integration of the geologic core study and the core logging measurements, or layering and interface properties.

17. A method for selecting a landing point comprising:
conducting a geologic core study and obtaining core logging measurements from a core sample taken from a formation;
mapping and characterizing a plurality of interfaces in the formation based on an integration of the geologic core study and the core logging measurements;
integrating the mapping and characterization of the plurality of interfaces with an open hole log to determine a cumulative value of hydrocarbon filled porosity as a function of depth within the formation, wherein the cumulative value of hydrocarbon filled porosity is re-set to zero at each of a subset of the plurality of interfaces;
selecting a plurality of potential landing points at depths within the formation having a production potential above a minimum threshold;
determining a fracture surface area at each of the plurality of potential landing point locations using hydraulic fracturing modeling, or a distance between the potential landing point locations and the plurality of interfaces; and
selecting a landing point that maximizes the fracture surface area from the plurality of potential landing points.

* * * * *